United States Patent
Hyoki et al.

(10) Patent No.: US 7,430,319 B2
(45) Date of Patent: Sep. 30, 2008

(54) IMAGE COLLATING APPARATUS FOR COMPARING/COLLATING IMAGES BEFORE/AFTER PREDETERMINED PROCESSING, IMAGE FORMING APPARATUS, IMAGE COLLATING METHOD, AND IMAGE COLLATING PROGRAM PRODUCT

(75) Inventors: Kenji Hyoki, Ebina (JP); Kagenori Nagao, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 706 days.

(21) Appl. No.: 10/321,667

(22) Filed: Dec. 18, 2002

(65) Prior Publication Data

US 2003/0113000 A1 Jun. 19, 2003

(30) Foreign Application Priority Data

Dec. 19, 2001 (JP) .............................. 2001-385876
Nov. 7, 2002 (JP) .............................. 2002-324258

(51) Int. Cl.
 *G06K 9/00* (2006.01)
(52) U.S. Cl. ..................................... 382/168; 382/112
(58) Field of Classification Search ................. 382/168, 382/112, 144
See application file for complete search history.

(56) References Cited

U.S. PATENT DOCUMENTS

| | | | | |
|---|---|---|---|---|
| 3,846,752 A | * | 11/1974 | Nakano et al. | 382/206 |
| 4,811,414 A | * | 3/1989 | Fishbine et al. | 382/272 |
| 5,073,949 A | * | 12/1991 | Takeda et al. | 382/115 |
| 5,568,564 A | * | 10/1996 | Ozaki | 382/149 |
| 5,625,703 A | * | 4/1997 | Okuda et al. | 382/112 |
| 5,757,981 A | * | 5/1998 | Kawakubo | 382/293 |
| 5,771,071 A | * | 6/1998 | Bradley et al. | 348/335 |
| 5,889,884 A | * | 3/1999 | Hashimoto et al. | 382/168 |
| 5,999,636 A | * | 12/1999 | Juang | 382/112 |
| 6,205,239 B1 | * | 3/2001 | Lin et al. | 382/149 |
| 6,351,556 B1 | * | 2/2002 | Loui et al. | 382/164 |
| 6,631,209 B1 | * | 10/2003 | Kanamori | 382/169 |
| 6,967,752 B1 | * | 11/2005 | Katakura | 358/518 |

FOREIGN PATENT DOCUMENTS

| | | |
|---|---|---|
| JP | 7-31134 | 1/1995 |
| JP | 8-35936 | 2/1996 |
| JP | 11-194154 | 7/1999 |
| JP | 3140838 B2 | 12/2000 |
| JP | 2002-181732 | 6/2002 |

* cited by examiner

*Primary Examiner*—Bhavesh Mehta
*Assistant Examiner*—Yuzhen Ge
(74) *Attorney, Agent, or Firm*—Morgan, Lewis & Bockius LLP

(57) ABSTRACT

An image collating apparatus comprises a device for setting a plurality of predetermined paths in a reference image and a check image and accumulating pixel values in the paths of both images with respect to the plurality of paths to obtain a projected waveform or histogram of the reference and the check image; a device for generating information of a characteristic value as reference characteristic value information based on the projected waveform or histogram of the reference image; a device for generating the information of the characteristic value as check characteristic value information based on the projected waveform or histogram of the check image; and a device for collating the reference image with the check image based on the reference characteristic value information and check characteristic value information.

14 Claims, 20 Drawing Sheets

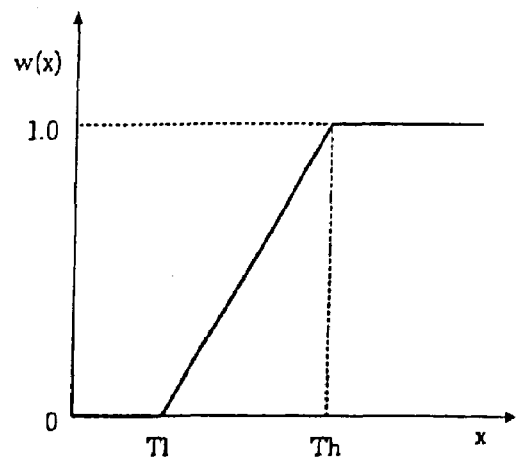
FIG. 7
| | LOCAL CONVEX PEAK LIST OF REGISTERED DOCUMENT |
|---|---|
| | LOCAL CONVEX PEAK (POSITION, WAVE HEIGHT VALUE) |
| A1 | (1 0, 1 0 0) |
| A2 | (2 0, 5 0) |
| A3 | (3 0, 7 0) |
| | LOCAL CONVEX PEAK LIST OF COLLATED DOCUMENT |
|---|---|
| | LOCAL CONVEX PEAK (POSITION, WAVE HEIGHT VALUE) |
| B1 | (1 9, 1 0 0) |
| B2 | (2 8, 4 5) |
| B3 | (3 1, 2 0) |
| B4 | (3 7, 7 5) |
FIG. 8
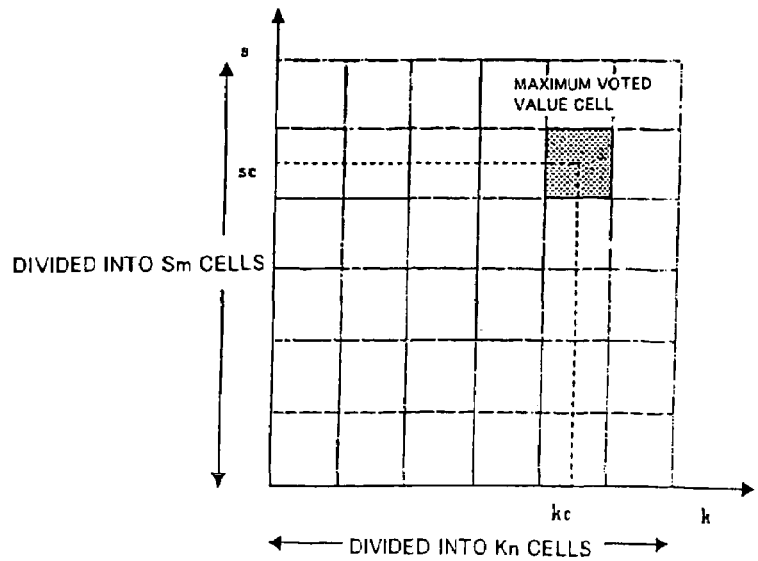
FIG. 10

IMAGE COLLATING APPARATUS FOR COMPARING/COLLATING IMAGES BEFORE/AFTER PREDETERMINED PROCESSING, IMAGE FORMING APPARATUS, IMAGE COLLATING METHOD, AND IMAGE COLLATING PROGRAM PRODUCT

BACKGROUND OF THE INVENTION

1. Field of the Invention

The present invention relates to an image collating apparatus for comparing/collating images before/after predetermined processing, an image forming apparatus, an image collating method, and an image collating program product.

2. Description of the Related Art

In recent years, processing speeds of image forming apparatuses such as printers and printing presses have greatly increased. On the other hand, to obtain high quality printing results, it is preferable for a user to prevent generation of "noise" ("deletion", referring to defects caused when toner is not attached and an image is not formed, or "dirt", referring to defects caused when that excess toner remains on the print surface) when an image is recorded on a medium. Commonly, the user visually confirms the printed material in order to remove media on which such noise is present. However, such visual inspection is time consuming and tiring, and it is difficult to maintain consistency of criterion among a plurality of operators. There is also a problem that a great deal of time is required to train the operators. To solve the problem, various automatic image inspection apparatuses have been proposed.

SUMMARY OF THE INVENTION

As described above, visual inspection of individual images fed out of a printing press is time consuming and imperfect. To solve the problem, an image (reference image) as a printing object, for example, of a printer, is compared with an image (check image) obtained by capturing the image printed on media such as paper sheets, making it possible to verify whether or not each pixel correctly corresponds.

Moreover, without checking each pixel, it is also possible to compare the reference image with the check image by pattern matching. For example, in Japanese Patent Laid-Open Publication No. 07-31134, a technique is disclosed which comprises summing values of pixels along a predetermined path to generate a "projected" waveform with respect to two image data as comparison objects, calculating correlation between projected waveforms or histograms from each image data, and comparing the images.

However, because a very large amount of processing time is required for checking individual pixels one at a time, the method of Japanese Patent Laid-Open Publication No. 07-31134 is not practical. Moreover, in the method of performing pattern matching to correlate the reference image with the check image, unless the dimensional or parallel displacement of these images is corrected, correct comparison cannot be performed. However, in many cases, because of the noise in the image, it is difficult to correctly calculate a correction amount of dimensional or parallel displacement. Furthermore, in recent years, as printer speed has increased, it has become necessary to speed up the calculation of the correction amount of the dimensional or parallel displacement.

To address this problem, according to one aspect of the present invention, there is provided an image collating apparatus which collates a reference image as a criterion of processing with a check image obtained by subjecting the reference image to predetermined processing, comprising means for setting a plurality of predetermined paths in the reference image and accumulating pixel values in the paths with respect to the plurality of paths to obtain a projected waveform or histogram of the reference image; means for setting the plurality of predetermined paths in the check image and accumulating the pixel values in the paths with respect to the plurality of paths to obtain the projected waveform or histogram of the check image; means for extracting from the projected waveform or histogram of the reference image information of a characteristic value as reference characteristic value information; means for extracting from the projected waveform or histogram of the check image information of the characteristic value as check characteristic value information; and means for collating the reference image with the check image based on the reference characteristic value information and check characteristic value information.

It should be noted that as used in the present specification the term "collate" or "collating" refers to analysis and comparison for the purpose of identifying points of agreement and difference, and does not relate to the ordering or assembly of printed pages.

To solve the above-described problem, according to another aspect of the present invention, there is provided an image forming apparatus which forms a reference image as a criterion of processing, and an image based on the reference image, comprising: an image collating unit including: means for setting a plurality of predetermined paths in the reference image, and accumulating pixel values in the paths with respect to the plurality of paths to obtain a projected waveform or histogram of the reference image; means for obtaining the formed image as a check image, setting the plurality of predetermined paths in the check image, and accumulating the pixel values in the paths with respect to the plurality of paths to obtain the projected waveform or histogram of the check image; means for extracting information of a characteristic value as reference characteristic value information from the projected waveform or histogram of the reference image; means for extracting information of the characteristic value as check characteristic value information from the projected waveform or histogram of the check image; and means for collating the reference image with the check image based on the reference characteristic value information and check characteristic value information.

To solve the above-described problem, according to still another aspect of the present invention, there is provided an image collating method for collating a reference image as a criterion of processing with a check image obtained by subjecting the reference image to predetermined processing, comprising: a step of setting a plurality of predetermined paths in the reference image, and accumulating pixel values in the paths with respect to the plurality of paths to obtain a projected waveform or histogram of the reference image; a step of setting the plurality of predetermined paths in the check image, and accumulating the pixel values in the paths with respect to the plurality of paths to obtain the projected waveform or histogram of the check image; a step of extracting information of a characteristic value as reference characteristic value information from the projected waveform or histogram of the reference image; a step of extracting information of the characteristic value as check characteristic value information from the projected waveform or histogram of the check image; and a step of collating the reference image with the check image based on the reference characteristic value information and check characteristic value information.

To solve the above-described problem, according to still further aspect of the present invention, there is provided an image collating program product which collates a reference image as a criterion of processing with a check image obtained by subjecting the reference image to predetermined processing and which allows a computer to execute the processing including: a procedure of setting a plurality of predetermined paths in the reference image, and accumulating pixel values in the paths with respect to the plurality of paths to obtain a projected waveform or histogram of the reference image; a procedure of setting the plurality of predetermined paths in the check image, and accumulating the pixel values in the paths with respect to the plurality of paths to obtain the projected waveform or histogram of the check image; a procedure of extracting information of a characteristic value as reference characteristic value information from the projected waveform or histogram of the reference image; a procedure of extracting information of the characteristic value as check characteristic value information from the projected waveform or histogram of the check image; and a procedure of collating the reference image with the check image based on the reference characteristic value information and check characteristic value information.

BRIEF DESCRIPTION OF THE DRAWING

The present invention will be described hereinafter in detail with reference to the accompanying drawings:

FIG. 7 is an explanatory view showing a function for obtaining the width of the projected waveform or histogram;

FIG. 8 is an explanatory view showing one example of a peak list;

FIG. 10 is an explanatory view showing an outline of a procedure of estimating the similarity transformation parameter;

DESCRIPTION OF THE PREFERRED EMBODIMENT

[Operation Principle]

Figure 1:
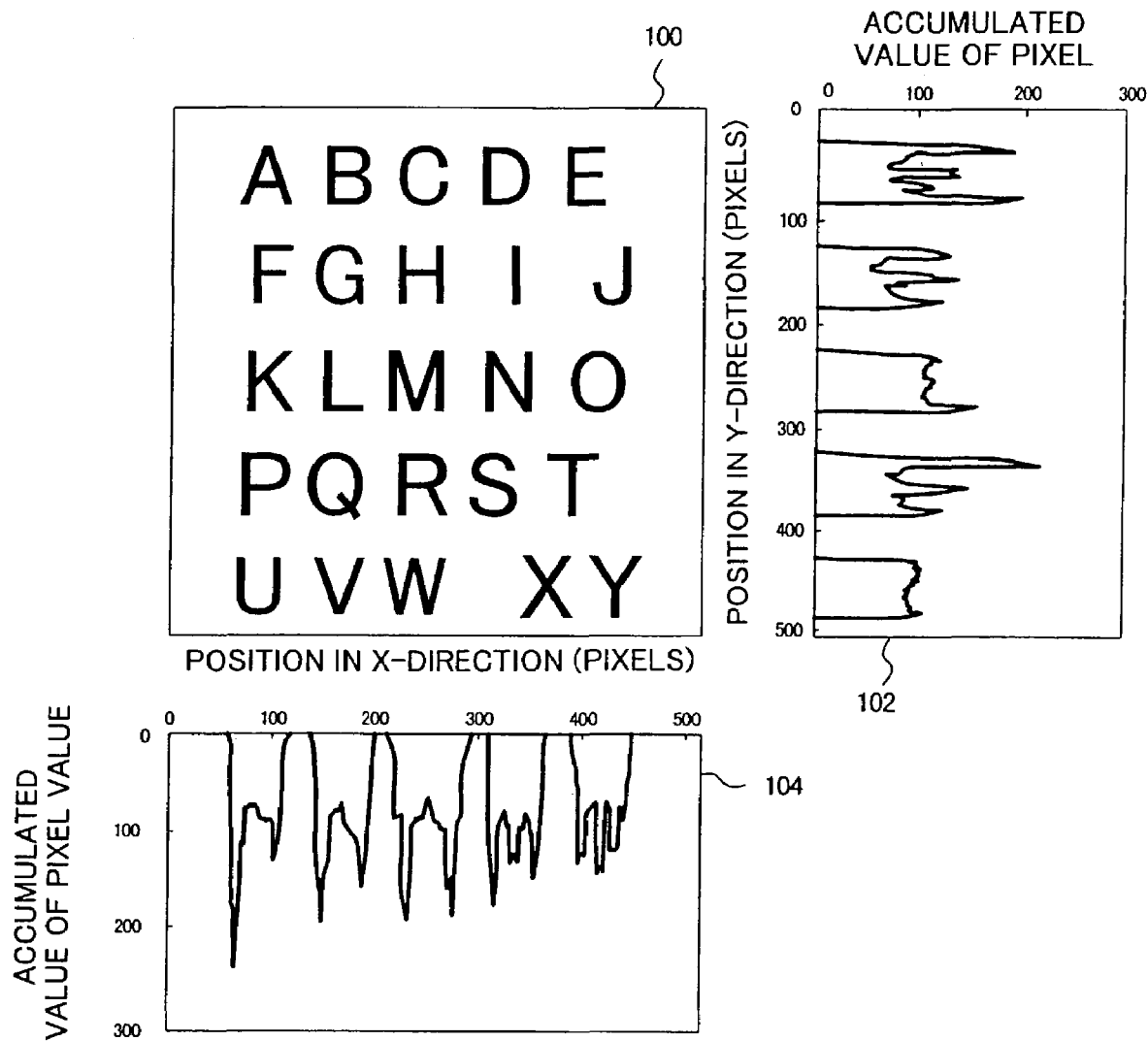
FIG. 1 is a diagram showing an example of a projected waveform or histogram with respect to a reference image in horizontal and vertical directions.

An embodiment of the present invention will be described with reference to the drawings. First, the principle upon which the image collation performed by an image collating apparatus according to the embodiment of the present invention is based will be described. To collate image data, enlargement/reduction ratios of two image data relating to the collation must agree with each other, and correspondence between positions of pixels as the objects of comparison must be established. A problem that then arises is that the preprocessing, mainly including the correction of the enlargement/reduction ratio and parallel displacement correction, must be executed to facilitate association of the pixels. The principle of such preprocessing will next be described hereinafter.

The image collating apparatus of the embodiment of the present invention collates a printed image (hereinafter referred to as a "check image") with a reference image as a criterion to judge whether or not the images agree with each other, and converts both the check and reference images into raster image data. Moreover, with respect to this raster image data, one waveform or histogram projected into at least one of horizontal and vertical directions is formed.

The check image may be obtained by capturing the reference image formed on a printing medium with an image capturing apparatus such as a scanner. The check image can be generated from either a fixed image or an image that has not yet been fixed onto the printing medium. However, because it is also possible to collate/check an offset (deletion) caused by a fixing unit, it is normally preferable to create the check image from the fixed image. This is also preferable because capturing of a fixed image lessens the chance of toner adhering to or soiling an illumination portion or optical system of the image capturing apparatus.

Here, the term "projection" is used to refer to processing in which pixel values of pixels in a certain path are accumulated along the path of raster-type image data. With a plurality of paths, a sequence of values in which the accumulated results are arranged in a projection space forms a projected waveform or histogram. By computer processing, the accumulated results of the pixel values are obtained for each path, and the projected waveform or histogram is digitally represented by a set of accumulated results (accumulated value sequence). Here, it is actually preferable to use a known inclination correction technique to correct any slight tilting or inclination of the image data as it is captured before a forming the projected waveform or histogram.

Moreover, the projected waveform or histogram of the reference image is preferably prepared in advance. Here, when the reference image is the image data captured by the scanner, the projected waveform or histogram can be directly generated from the scanned image. However, for text data prepared by a word processor, the data is first rasterized and converted into the image data, and thereafter the projected waveform or histogram is generated.

Figure 2:
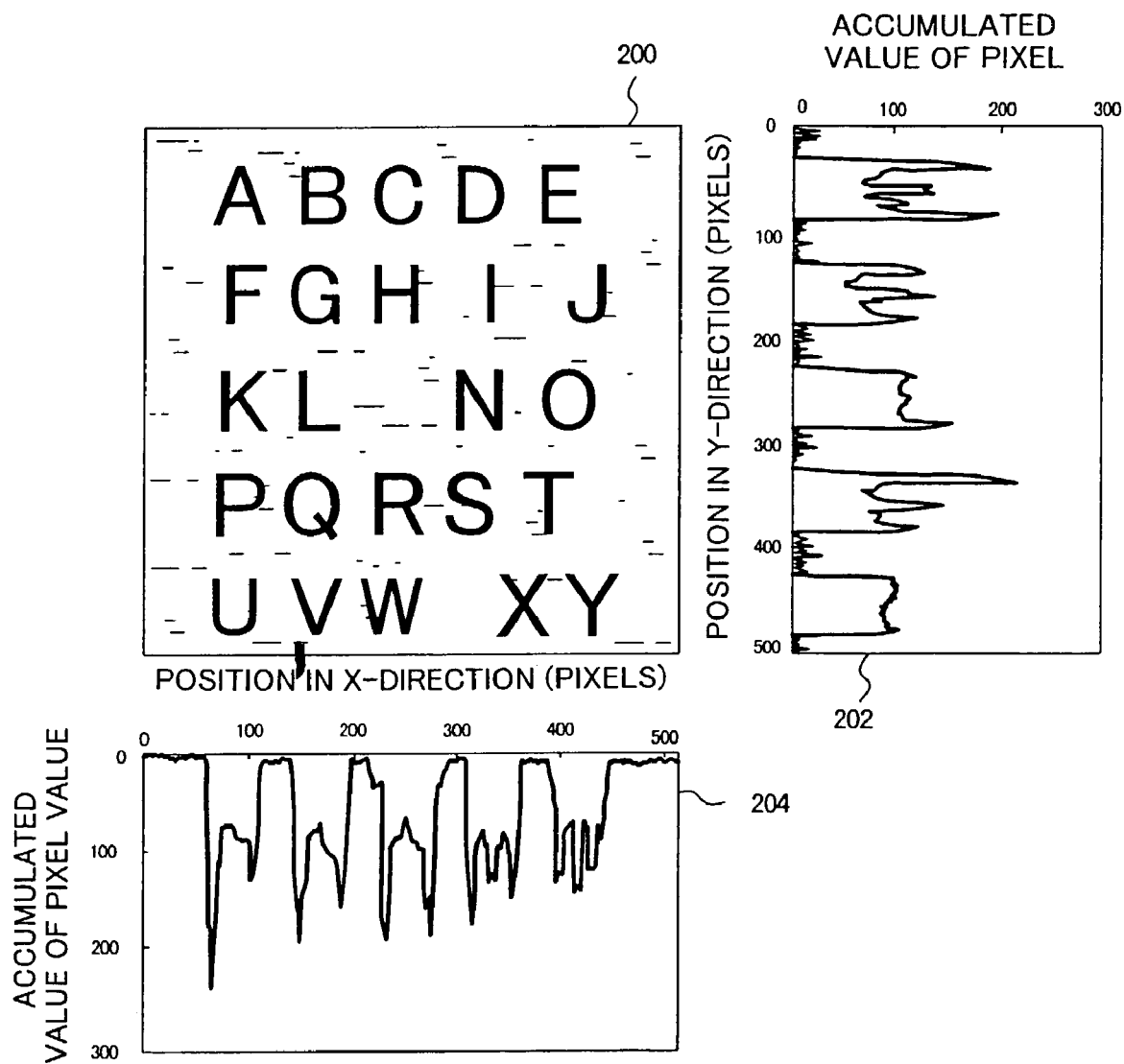
FIG. 2 is a diagram showing an example of the projected waveform or histogram with respect to a check image in the horizontal and vertical directions.

FIG. 1 shows results of a projected waveform or histogram 102 of a vertical direction and a projected waveform or histogram 104 of a horizontal direction formed with respect to the raster image data of a reference image 100. Moreover, FIG. 2 shows results of a projected waveform or histogram 202 of the vertical direction and a projected waveform or histogram 204 of a horizontal direction formed with respect to the raster image data of a check image 200. From the image formation it can be seen that noise ("deletion" of a portion M of the reference image or "dirt" caused by excessive toner) is generated in the check image 200, the shapes of peaks of the projected waveforms or histograms 202 and 204 differ from those of the projected waveforms or histograms 102 and 104 generated from the reference image 100, and small noise components are superimposed in their entirety.

It should be noted that for the projected waveform or histogram, with respect to the raster image data, the pixel values may be accumulated not only in the vertical and horizontal directions but also in a plurality of arbitrary paths along the image. For example, a plurality of paths having a certain inclination with respect to the raster image data are determined, and the pixel values along the respective paths may be accumulated. Additionally, to compare the projected waveform or histogram of the reference image with that of the check image, it is necessary to specify the respective paths in the reference and check images. Moreover, to perform the accumulation in the reference and check images, an accumulation order (i.e., order of calculation of the accumulated values) must be consistent among the respective paths because accumulated values s are sequentially compared.

When the embodiment of the present invention is adopted, there is possibility that, during preparation of the check image, that is, during the capturing of the printed image, the enlargement/reduction ratio and position of the check image will slightly differ from those of the reference image due to restrictions of the apparatus. When such projected waveforms or histograms are compared, similarity does not indicate a correct value. Arrangements are made so that in such a case parameters of scaling and parallel displacement are obtained based on each projected waveform or histogram. These parameters are used to refer to the corresponding pixel in the pattern matching.

A method of obtaining the parameters of the scaling and parallel displacement (similarity transformation parameters) will next be described. In the embodiment of the present invention, in order to obtain the similarity transformation parameter, the characteristic portion of each projected waveform or histogram is extracted, and positional relations are compared to obtain the similarity transformation parameter. Here, the characteristic portion may be an extreme value (local peak), differential waveform characteristic value of inflection points (a point at which an n-dimensional differential value is "0"), maximum value, a position where a predetermined value is obtained, gravity center position, or characteristic values obtained from the projected waveforms or histograms, such as their peak width. For the reference image, these characteristic values are preferably extracted and stored beforehand.

Moreover, the projected waveforms or histograms of the reference and check images are subjected to discrete Fourier transform (DCT), and the characteristic value may also be extracted from results of Fourier transformation. A specific example method using Fourier transformation will be described later.

For example, when the local peak of each projected waveform or histogram can be obtained, the position of the local peak is obtained. Because there are usually a plurality of local peaks in the projected waveform or histogram, a list of positions consists of positions of local peaks. This list of the positions (peak list) corresponds to "reference characteristic value information" or "check characteristic value information" of the present invention.

Figure 3:
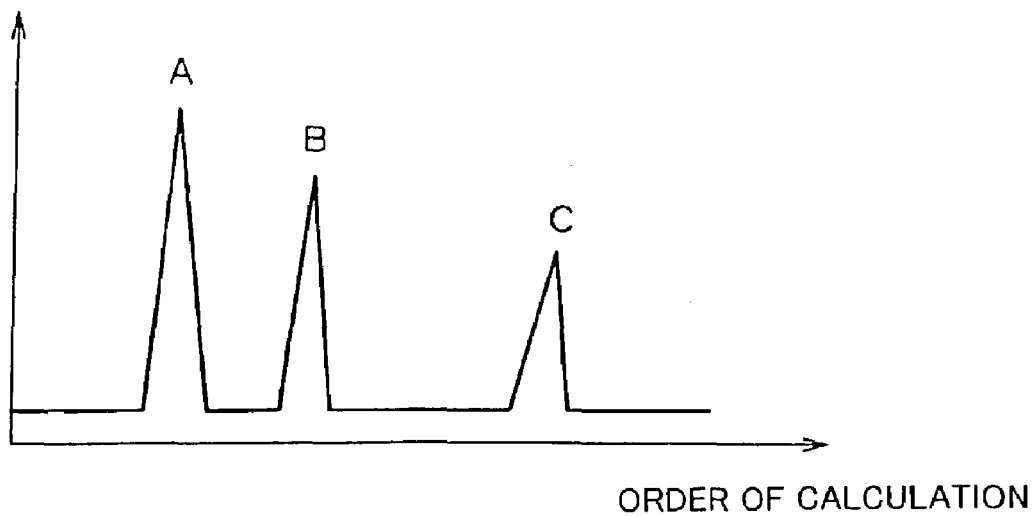
FIG. 3 is an explanatory view of an outline of the association of peak positions.
Figure 3:
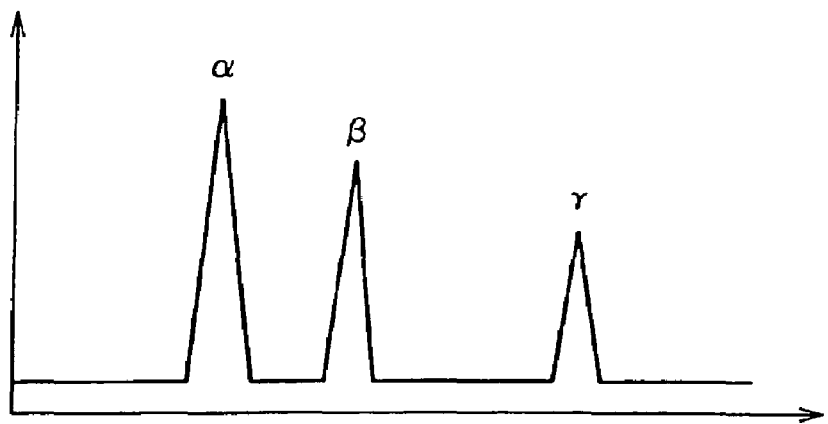

Moreover, the peak list concerning the projected waveform or histogram of the check image is compared with the peak list concerning the projected waveform or histogram of the reference image to obtain the similarity transformation parameter. In this comparison processing, the respective peak positions are corresponded with one another to obtain the similarity transformation parameter. For example, as schematically shown in FIG. 3, each of two projected waveforms or histograms to be compared includes three peaks (A, B, C and α, β, γ). In the following are described examples of two images having the same image data, in which (correct) association performed so as to match A with α or B with β differs from (wrong) association performed so as to match A with β or B with γ. In the following, it is assumed for simplicity of description that the enlargement/reduction ratios of both of the images to be compared are in agreement with each other, i.e., the scaling is not considered. For the same reason, portions other than peaks are shown as being flat in FIG. 3.

That is, a parallel displacement amount obtained by the relation between A and α substantially agrees with that obtained by the relation between B and β. On the other hand, the parallel displacement amount obtained by the relation between A and β generally differs from that obtained by the relation between B and γ.

Then, all corresponding operations are tried without any loss, and results are compared to obtain a maximum likelihood value according to rule of majority decision, so that a correct value is obtained.

When scaling is required, a relationship between a scaling amount k and parallel displacement amount s is obtained from the correspondence of the peak positions in each peak list. That is, when a peak position $x_i$ concerning one image data is corresponded with a peak position $\xi_i$ concerning the other image data, a relation is obtained as represented by the following equation (1).

$$\xi_i = k \cdot x_i + s \quad (1)$$

Moreover, the respective peak positions are corresponded without any loss, and a plurality of results of the equation (1)

are drawn as lines in a k-s plane ((scaling amount)-(parallel displacement amount) plane). Ideally, coordinates which many lines intersect are then obtained, and a correct scaling amount is obtained as a coordinate value (k, s). Here, "ideally" is used because the k or s obtained from each line does not necessarily match because of factors such as errors in calculation. Then, the maximum likelihood value is selected according to majority rule to determine k, s. With this correct association, it is noted that a large number of prospective parameters are concentrated in the vicinity of a certain value, and that majority rule is used to obtain the maximum likelihood value.

Moreover, in this example, to prepare a peak list from the projected waveform or histogram, the projected waveform or histogram itself is used. However, a projected waveform or histogram generated from a character string contains many high-frequency components a much noise caused by dirt and unnecessary printing not present in the original. However, to estimate the similarity transformation parameter, it is sufficient to use information such as line pitches and line lengths, and shapes such as the line pitches are reflected in low-frequency components of the projected waveform or histogram. Then, from a viewpoint of noise reduction and stabilization of local peak detection processing, low-pass filter processing of the projected waveform or histogram is preferably performed. Furthermore, since a slight concave/convex portion is present in the projected waveform or histogram subjected to the low-pass filtering, a large number of local peaks are detected and the amount of calculation is large. Therefore, the peak list preferably includes only the position of the local peak indicating a general concave/convex portion required for estimating the similarity transformation parameter.

Figure 4:
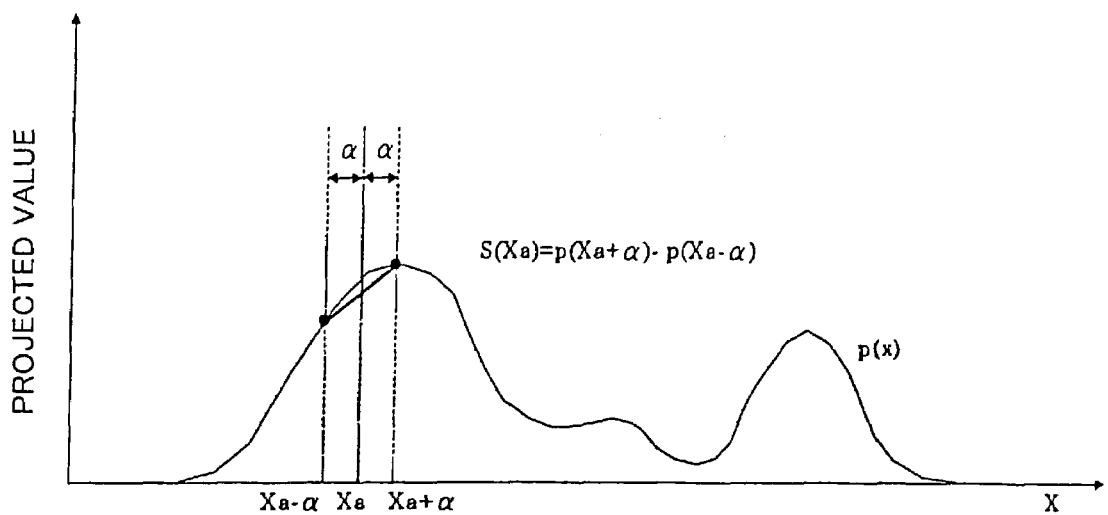
FIG. 4 is an explanatory view showing a local peak detection method for detecting a general concave/convex state of the projected waveform or histogram.

A method of detecting only the local peak indicating a general concave/convex portion will next be described. FIG. 4 is an explanatory view of the local peak detection method for detecting a general concave/convex state of the projected waveform or histogram. In FIG. 4, p(x) denotes a wave height value in position x of the projected waveform or histogram after the low-pass filtering, and α denotes a predetermined window width. The inclination of the projected waveform or histogram is zero in the local peak position, but the position is obtained by an inclination of a line connecting the projected wave height values in opposite end positions of a window instead of obtaining the inclination as a zero intersection of a differential projected waveform or histogram. The inclination of the line in position $X_aA$ is proportional to $S(X_aA)$ of the following equation (2).

$$S(X_a) = p(X_a + \alpha) - p(X_a - \alpha) \quad (2)$$

A point at which positive/negative of this $S(X_aA)$ changes is a local peak position. Here, it is preferable to acquire information indicating whether the point is a convex peak changing to negative from positive or concave peak changing to positive from negative as peak attribute information together with the peak list. When the projected wave height value in a point apart from the noted position by a given distance α is referred to, it is possible to detect a prospective peak indicating the general concave/convex state of the projected waveform or histogram without being influenced by the micro concave/convex portion of the projected waveform or histogram.

Only a peak effective for the detection of the similarity transformation parameter is selected from these prospective peaks. Because the similarity transformation parameter is obtained by corresponding the general concave/convex portions of the projected waveforms or histograms with one another, it is preferable to remove the micro peaks.

Figure 5:
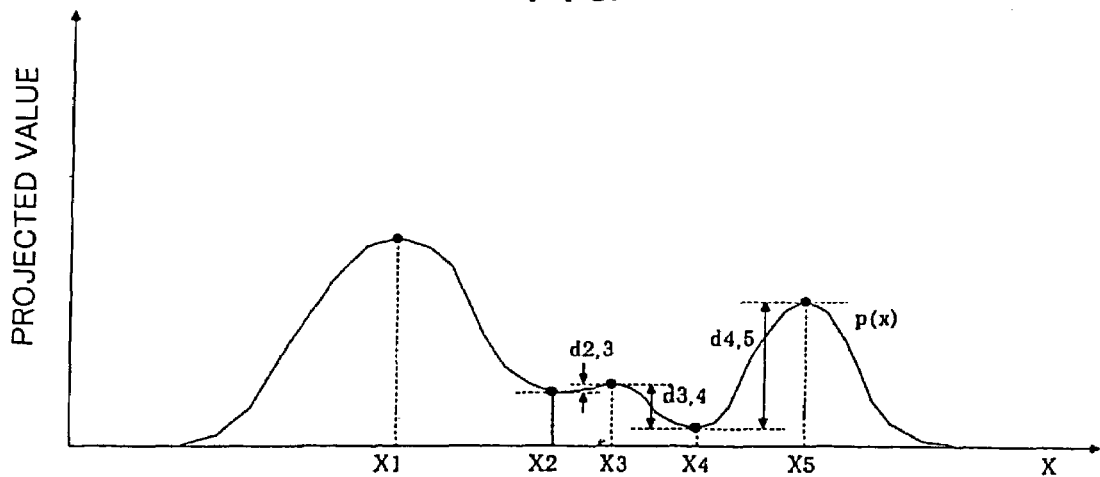
FIG. 5 is an explanatory view showing an operation principle of means for selecting a local peak.

FIG. 5 is a diagram showing the operation principle of means for selecting the local peak. In FIG. 5, the positions (five positions in total including x1 to x5) of the prospective local peaks obtained by the method shown in FIG. 4 are detected. In the example shown in FIG. 5, for example, the local peak in x2 or x3 is the prospective peak to be removed as the micro concave/convex portion.

The following processing is performed in the present embodiment in order to remove the micro local peak. That is, with respect to a certain local peak position Xn, an amount Dn concerning a difference between the projected wave height value in the position and the wave height value in the adjacent local peak position is obtained as in the following equation (3).

$$D_n = min(d_{n-1,n}, d_{n,n+1}) \quad (3),$$

wherein $d_{n,n+1} = |p(x_{n+1}) - p(x_n)|$, and min(a,b) denotes a smaller value of a and b.

Moreover, with respect to a position having the adjacent local peak only on one side, such as x1 or x5, an absolute value of the difference from the wave height value of the local peak is set to Dn.

When Dn obtained in this manner and a predetermined threshold value Td satisfy the following equation (4), the local peak in the position Xn is added as an actual comparison object peak to the peak list.

$$D_n > T_d \quad (4)$$

Moreover, a ratio Rn of the wave height value represented in equation (5), not the difference of the projected wave height value in the adjacent local peak position, may be used to select the peak.

$$R_n = min(r_{n-1,n}, r_{n,n+1}) \quad (5),$$

wherein $$r_{n,n+1} = \frac{max\{p(x_n), p(x_{n+1})\}}{min\{p(x_n), p(x_{n+1})\}}$$

and max(a,b) denotes a larger value of a and b.

Moreover, when Rn obtained by this equation (5) and predetermined threshold value Tr satisfy the condition of equation (6), the local peak in the position Xn is added to the peak list.

$$R_n > T_r \quad (6)$$

It is further preferable to obtain width and center of gravity of the projected waveform or histogram as the peak attribute information beforehand for a purpose of contributing to the comparison among the peak lists in a subsidiary manner. Although this information is not essential for the detection of the transformation parameter, it can be useful for increasing the speed or reliability of detection of the transformation parameters, as will described below.

Here, when the width of the peak is obtained, the projected waveform or histogram does not include noise. Moreover, when an offset portion accounting for paper color is not included, the width of non-zero section of the projected waveform or histogram may be used as the width of the projected waveform or histogram. However, since such an ideal example is very rare, in practice, the following processing must actually be performed in order to obtain a projection width.

Figure 6:
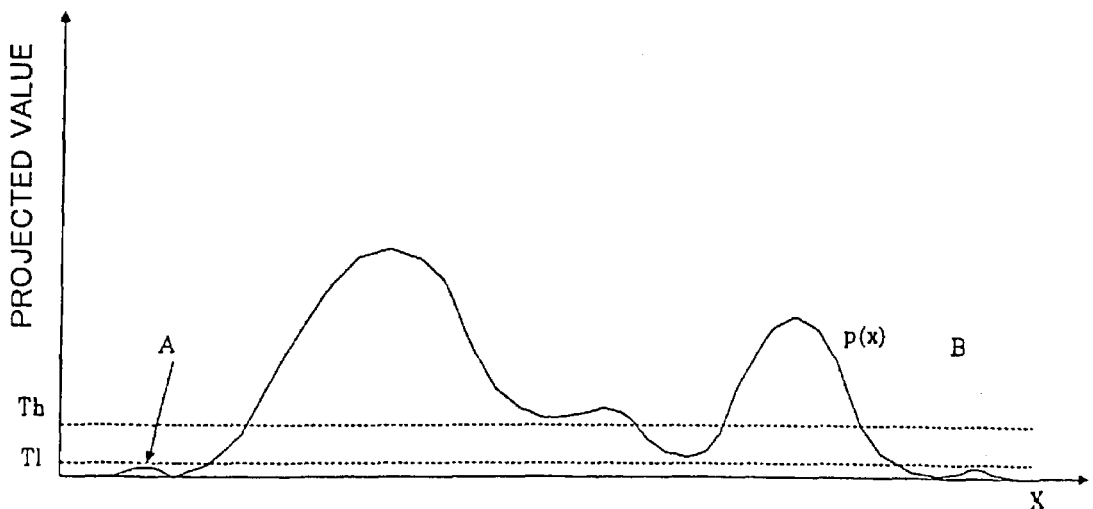
FIG. 6 is an explanatory view showing processing for detecting a width of the projected waveform or histogram.

FIG. 6 is an explanatory view of a process for detecting the width of the projected waveform or histogram. The actual projected waveform or histogram includes offset portions accounting for noise or paper color, such as regions A, B of FIG. 6 (non-zero region generated because a part of the pixel is not "white" by the background color). Then, threshold value processing is performed in order to remove these components. Additionally, when there are many wave height values in the vicinity of the threshold value, a slight difference hardly beyond the threshold value largely influences the width of the detected projected waveform or histogram, and therefore two different threshold values Th and Tl are set with respect to the projected waveform or histogram in the example of FIG. 6. For the lower threshold value Tl of these values, most of noise or offset levels are set to be lower than the value. For the higher threshold value Th, most of levels of original projected waveform or histogram are set to be above the value.

After these threshold values are set, a width W of the projected waveform or histogram is obtained by the following equation (7):

$$W = \sum_{x}^{P} w\{p(x)\}, \tag{7}$$

wherein, as shown in FIG. 7, w(•) is "0" with x having a relation of 0<x<Tl and is "1" with x having a relation of Th<x and is a function which linearly changes to "1" from "0" with Tl<x<Th. Moreover, P denotes the whole projected waveform or histogram. Therefore, in the equation (7), summation over the entirety of the projected waveform or histogram is intended. A threshold value processing function having a gentle slope is disposed between the threshold values Th and Tl in this manner. Thereby, even when the presence of many projected waveforms or histograms in the vicinity of the threshold value makes use of a single threshold value problematic, a large difference can be prevented from being generated in the detected width of the projected waveform or histogram.

On the other hand, a gravity center position G of the projected waveform or histogram is obtained from the following equation (8).

$$G = \frac{\sum_{x}^{P} x \cdot p(x)}{\sum_{x}^{P} p(x)} \tag{8}$$

The peak list and peak attribute information obtained in this manner are used to obtain the similarity transformation parameter. A concrete procedure for obtaining the similarity transformation parameter will next be described. First, the peak lists of the check image and reference image as the criterion of the comparison object are referred to, and the peak positions are corresponded with one another. To correspond the peak positions, the peak attribute information is referred to, and convex and concave peaks are individually matched. Next, based on a linear relation established between the scaling amount and parallel displacement amount necessary for matching two corresponded local peak positions, voting processing is performed onto the line in a (scaling amount)—(parallel displacement amount) plane. When all combinations of the local peak positions are subjected to this voting processing, a distribution of accumulated values of "voted values", those values which received votes, is formed on the (scaling amount)—(parallel displacement amount) plane. In the (scaling amount)—(parallel displacement amount) plane, a point at which the accumulated voted value increases indicates that two local peak lists well agree with each other. Therefore, the coordinate of the point (scaling amount, parallel displacement amount) must be obtained as the similarity transformation parameter.

That is, when there are a local concave peak list with respect to the projected waveform or histogram (A1 to A3), and a local convex peak list obtained from the projected waveform or histogram of the check image (B1 to B4) as shown in FIG. 8, the peak positions are corresponded with respect to the above two local peak lists. For example, to correspond local peaks A1 and B1, assuming that the scaling amount necessary for matching both the peak positions is k and the parallel displacement amount is s, coordinate "10" of A1 and coordinate "19" of B1 are used to establish the following equation (9):

$$19 = 10 \cdot k + s \tag{9}$$

Because this equation (9) is a linear equation including terms k and s, one line can be drawn in a k-s plane, that is, the (scaling amount)—(parallel displacement amount) plane based on this equation. When k, s bound by the condition of the equation (9) are used, both the image data relating to the comparison can be superposed upon each other in at least the local peak positions A1 and B1. Then, "one vote is cast for" the line as a prospective correction amount. That is, a vote is cast for each point on the line. The point which obtains for which the largest number of votes is cast is set later set as the maximum likelihood value.

Figure 9:
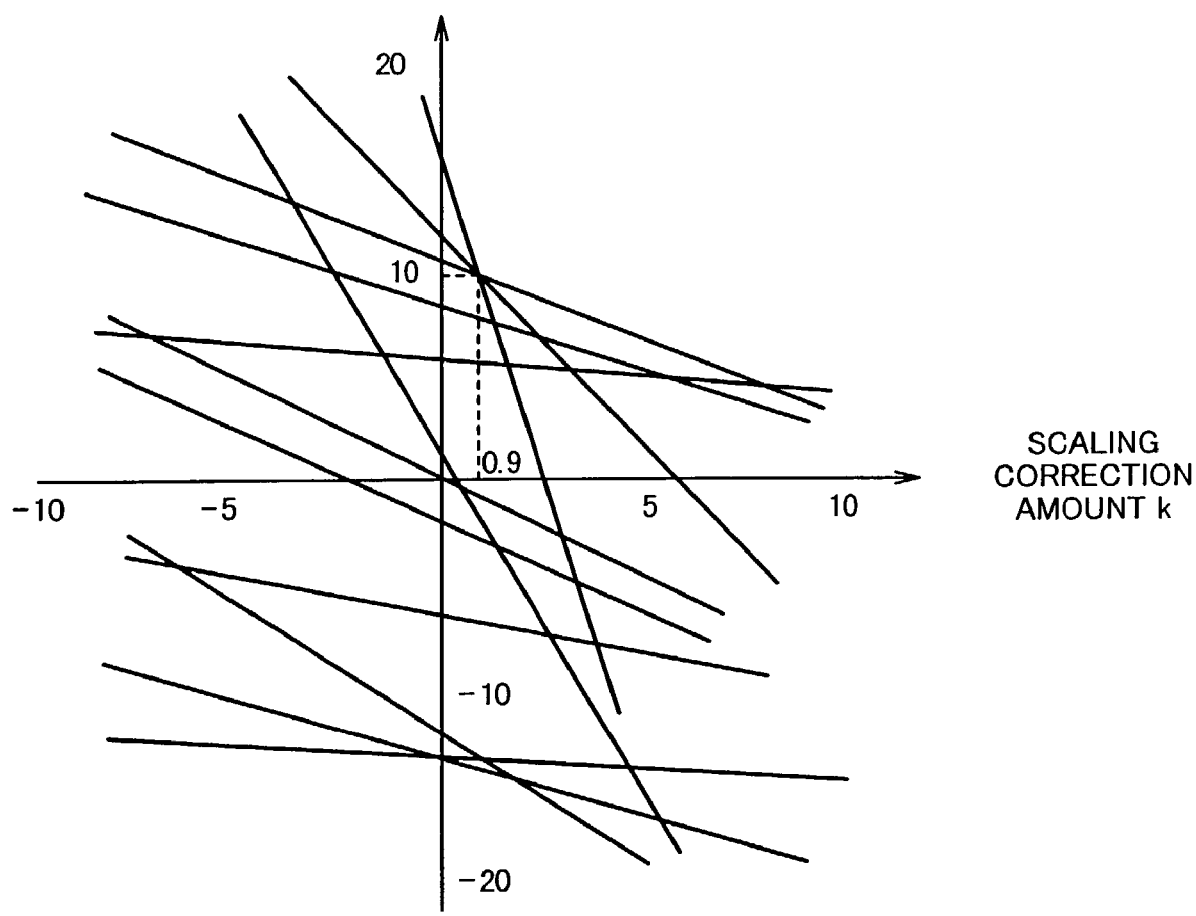
FIG. 9 is an explanatory view showing a procedure of voting for obtaining a similarity transformation parameter.

Similarly, when the local peak A1 shown in FIG. 8 is also corresponded with other peaks B2 to B4, the voting is performed for a total of four lines with respect to A1 in the (scaling amount)—(parallel displacement amount) plane as shown in FIG. 9. In general, assuming that the position of an i-th peak in the local peak list obtained from the projected waveform or histogram of a certain reference image is Aix, and the position of a j-th peak in the local peak list with respect to the projected waveform or histogram of the check image is Bjx, the relationship between the scaling amount k and parallel displacement amount s necessary for matching both the peak positions can be represented by equation (10) in the same manner as in the equation (1).

$$B_{ix} = k \cdot A_{ix} + s \tag{10}$$

Similar voting processing is also performed with respect to the remaining local peaks A2 and A3, such that the distribution of accumulated values of voted values is thereby formed in the (scaling amount)—(parallel displacement amount) plane.

It should be noted that the voted value with wave height value information of the local peak reflected therein may also be used instead of casting the constant value as the vote value. With respect to the local peak, it is natural to correspond large or small wave height values with one another, and the voted value therefore changes in accordance with the wave height value. That is, assuming that the wave height value of the i-th peak in the local peak list obtained from the projected waveform or histogram is Ais, and the wave height value of the j-th peak in the local peak list with respect to the projected waveform or histogram of the check image is Bjs, for example, a voted value V is determined as in the following equation (11).

$$V = \frac{\min(A_{is}, B_{is})}{\max(A_{is}, B_{is})} \quad (11)$$

Normalization processing for setting a maximum value of the wave height value of the local peak to a predetermined value must be performed in advance in order to apply the voted value of the equation (11).

The accumulated voted value formed on the (scaling amount)—(parallel displacement amount) plane in this manner reflects the agreement of two local peak lists. Therefore, when the peak point of the accumulated voted value formed on the plane is searched, the coordinate of the point indicates (scaling amount, parallel displacement amount) to be obtained. When this correction amount is used to correct one projected waveform or histogram, two projected waveforms or histograms are the best agreement each other. In the example of FIG. 6, a maximum accumulated voted value of (accumulated voted value)=3 is taken in (scaling amount, parallel displacement amount)=(0.9, 10). Thereby, when the projected waveform or histogram of registered document is multiplied by 0.9, and further moved in parallel by 10, it is the best agreement between two projected waveforms or histograms each other.

Additionally, it is seen that with the application of the above correction amount, only the local peak B3 on a collated document side does not have the local peak corresponding to the reference image. From this, it is estimated that the local peak B3 is a peak component by noises such as dirt on the sheet and unnecessary printing not present in the original. In the detection procedure of the similarity transformation parameter of the present embodiment, even when the local peak by such noise is generated, or there is detection leak, the similarity transformation parameter is estimated based on the voting processing as the rule of majority decision, and therefore any reduction in precision of the estimated correction amount can be prevented.

Figure 11:
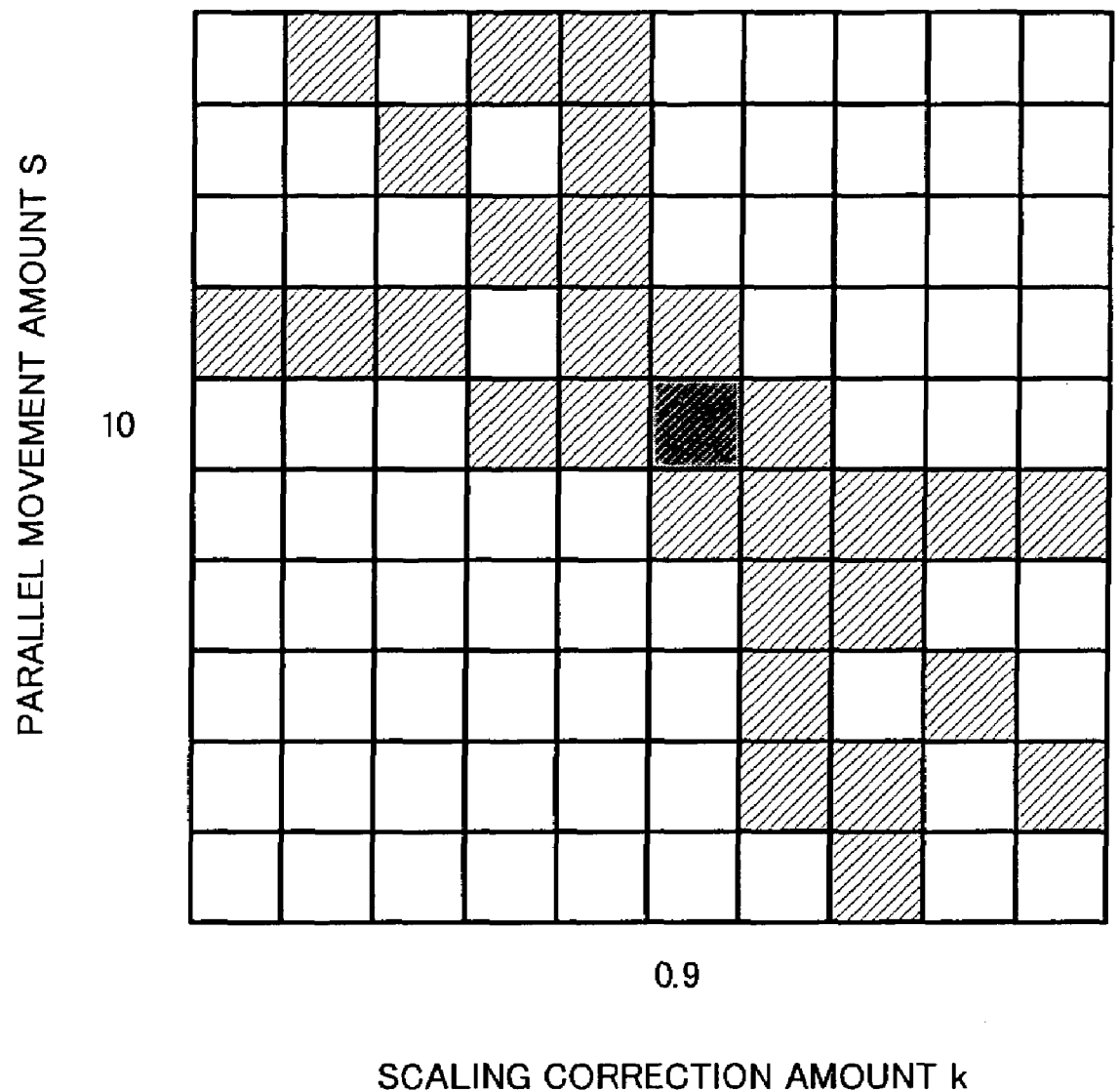
FIG. 11 is a diagram showing an example of the procedure of estimating the similarity transformation parameter.

In the above description, the peak point of the accumulated voted value formed on the (scaling amount)—(parallel displacement amount) plane is searched to detect the similarity transformation parameter, but this is an "ideal" example. In actual practice, the likelihood of errors at a local peak detection time or printing precision of original document makes it rare that a group of lines for performing the voting will all intersect at one point. Therefore, as procedure for estimating the similarity transformation parameter, there is also considered a method comprising "quantizing" the (scaling amount)—(parallel displacement amount) plane into kn cells divided in a scaling amount direction and sm cells divided in a parallel displacement amount direction as shown in FIG. 10; calculating the total of the voted values of each cell; and obtaining the cell whose total is maximum. Moreover, a center coordinate (kc, sc) of the cell whose total is maximum is obtained as the maximum likelihood value of the similarity transformation parameter. This can also be applied to computer processing. A transform of the example of FIG. 9 into the "quantized" (scaling amount)—(parallel displacement amount) plane is shown in FIG. 11. To ease description, an enlarged view of the (scaling amount)—(parallel displacement amount) plane is shown.

Figure 12:
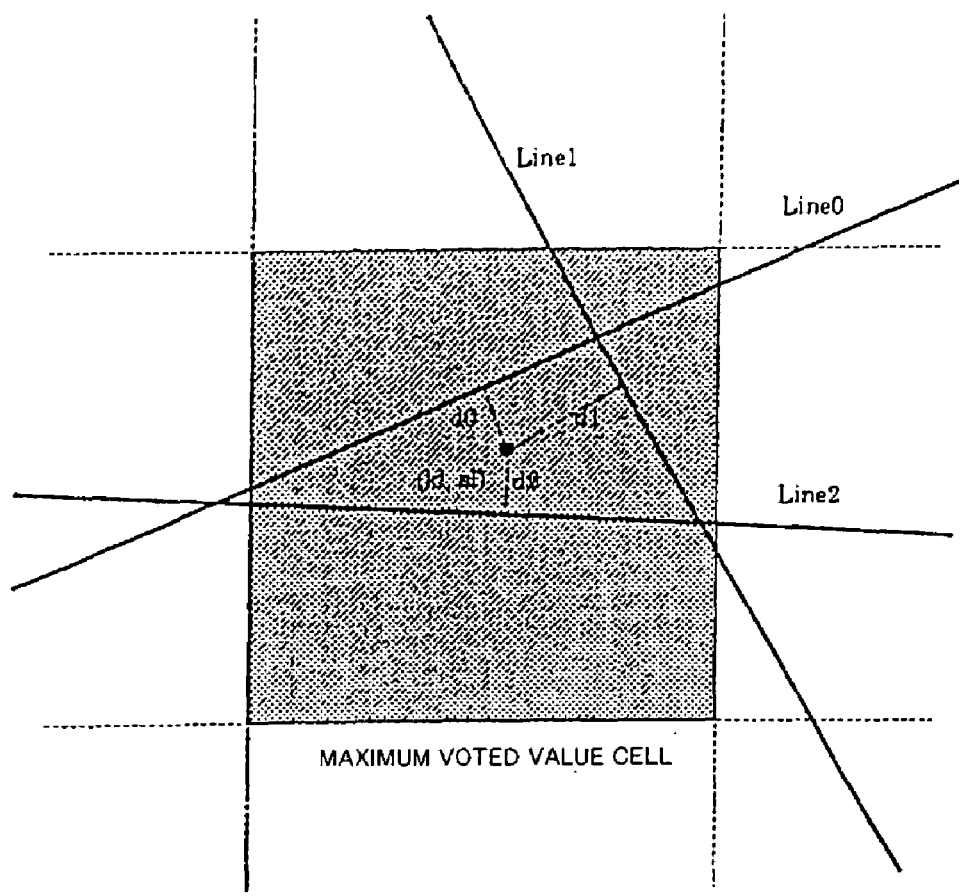
FIG. 12 is an explanatory view showing the outline of the procedure of estimating the similarity transformation parameter.

To further enhance precision, as shown in FIG. 12, after obtaining the cell whose total of the voted values is maximum, only the line group passing through the cell is selected from the line groups to be voted, the coordinate of the point positioned in a shortest distance from the line groups is obtained, and the coordinate is set to the maximum likelihood value. The coordinate of this point can be obtained as a result of the following procedure.

First, assuming that there are h lines passing through the cell having the maximum total of the voted values, the lines are represented by equation (12):

$$a_i \cdot k + b_i \cdot s + c_i = 0 \quad (12),$$

wherein i=0, 1, . . . , h−1. A distance di between one of these lines and one point (k, s) on the (scaling amount)-(parallel displacement amount) plane has the relationship described in equation (13).

$$d_i^2 = \frac{(a_i \cdot k + b_i \cdot s + c_i)^2}{a_i^2 + b_i^2} \quad (13)$$

A square sum D of the distance to each line from the point (k, s) is represented by the following equation (14):

$$D = \sum_{i=0}^{h-1} d_i^2 \quad (14)$$

Therefore, coordinate (k1, s1) of a point positioned in a shortest distance from the group of lines passing through the cell having the maximum total of the voted values can be obtained by joining and solving the following equations (15)-(16):

$$\frac{\partial D}{\partial k} = 0 \quad (15)$$

$$\frac{\partial D}{\partial s} = 0 \quad (16)$$

Furthermore, to obtain the coordinate of the point positioned in the shortest distance from the line group, the distance from each line may also be weighted with the voted value V determined in the equation (11). By weighting the voted value V, the probability that the local peaks are correctly corresponded in the line is high and the correction amount is detected. In this case, the equation (14) is rewritten as in equation (17).

$$D = \sum_{i=0}^{h-1} (V_i \cdot d_i)^2, \quad (17)$$

In this equation, Vi denotes the voted value onto the i-th line. Moreover, in the peak attribute information, information on the width and gravity center of the projected waveform or histogram can be useful for increasing the processing speed and enhancing reliability in estimating the similarity transformation parameter.

That is, in general, to estimate parameters using voting processing, there is a so-called "false peak problem" wherein a relatively large peak is generated in an inappropriate position. To reduce this effect, voting is not performed over an entire voting space, and voting need not be performed in regions which can be regarded as unnecessary. In the present embodiment, the information of the width and gravity center of the projected waveform or histogram is used to limit the voting region, such that the speed of transformation parameter detection processing is enhanced, and such that problematic effects can be reduced.

More specifically, the width of the projected waveform or histogram can be used to limit the voting region of the scaling amount direction in the (scaling amount)—(parallel displacement amount) plane. Assuming that the projected waveform or histogram width of the reference image is Wr, and the projected waveform or histogram width of the check image is Wi, a projected width ratio R can be obtained by equation (18). Then, the scaling amount in the similarity transformation parameter can be close to a value R. When two documents are the same, the projected waveforms or histograms must also have similar shapes, and a difference of scaling must be the ratio of the projected widths.

$$R = \frac{W_i}{W_r} \quad (18)$$

The peak width of the projected waveform or histogram will normally include error resulting from the offset portion by the noise or paper color. However, a true correction amount, that is, the scaling coordinate of the peak position of the voted value must still has a value close to R of the equation (18). Then, a predetermined scaling margin β centering on R of the equation (18) is set, and the voting region is limited in a range of the scaling margin β. In such a case, it is assumed that "the vote is cast" in the range of the scaling margin β in each line drawn in the (scaling amount)-(parallel displacement amount) plane, and the vote is not cast outside the range.

Moreover, the voting region can be limited to exclude the gravity center position information of the projected waveform or histogram. That is, if the gravity center position obtained by characteristics extraction means is correct, a relation of the following equation (19) must be established between the gravity center positions of two projected waveforms or histograms in the same manner as in the equation (10).

$$G_i = G_r \cdot k + s \quad (19),$$

Here, Gr and Gi denote the projected gravity center positions of the reference image and check image, respectively. In actual practice, the information of the obtained gravity center position includes error generated by the offset portion and resulting from noise or paper color. However, the true correction amount, that is, the peak position of the voted value must be positioned in the vicinity of the line represented by the equation (19). Then, an appropriate parallel displacement amount margin γ is set centering on the line of the equation (19), and the voting region is limited to that range.

Figure 13:
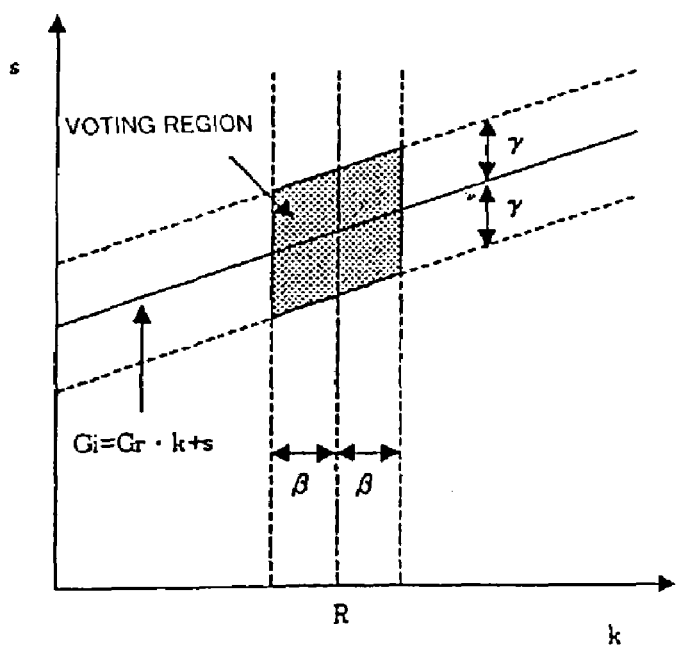
FIG. 13 is an explanatory view showing one example of limitation of a voting region.

Thereby, the voting region is limited to the range shown in FIG. 13, the voting processing onto the line outside the range or onto the line which does not originally pass through this region is omitted, the processing is speeded up, and the effects of the above-described false peak problem can be reduced.

Moreover, the scaling amount k and parallel displacement amount s can be obtained even when the projected waveforms or histograms of the reference image and check image are subjected to discrete Fourier transformation.

Figure 14A:
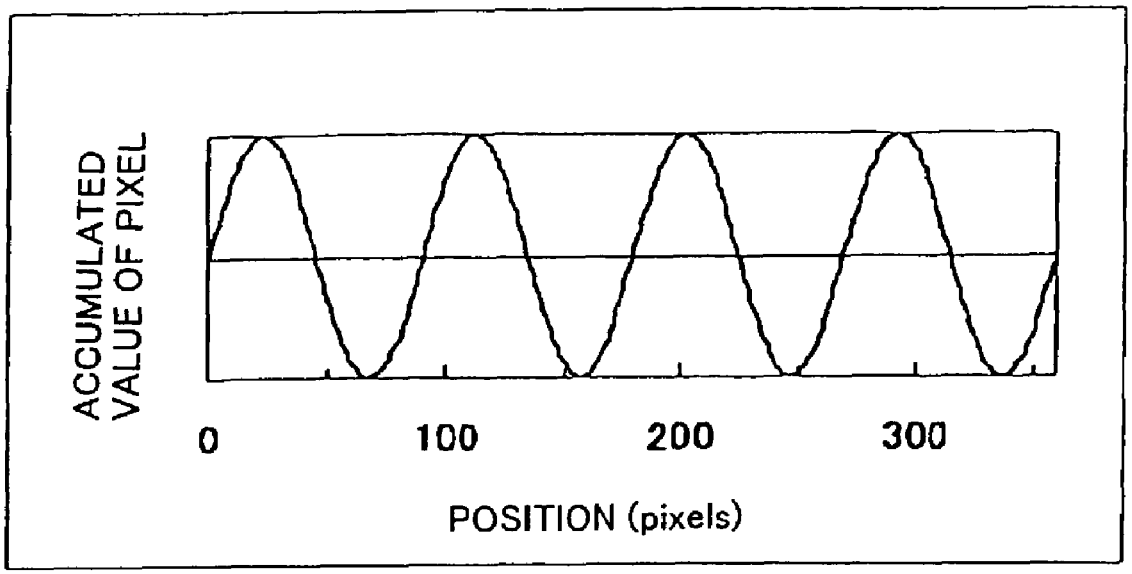
FIG. 14A is a diagram showing an example of a projected waveform or histogram of the reference image.
Figure 14B:
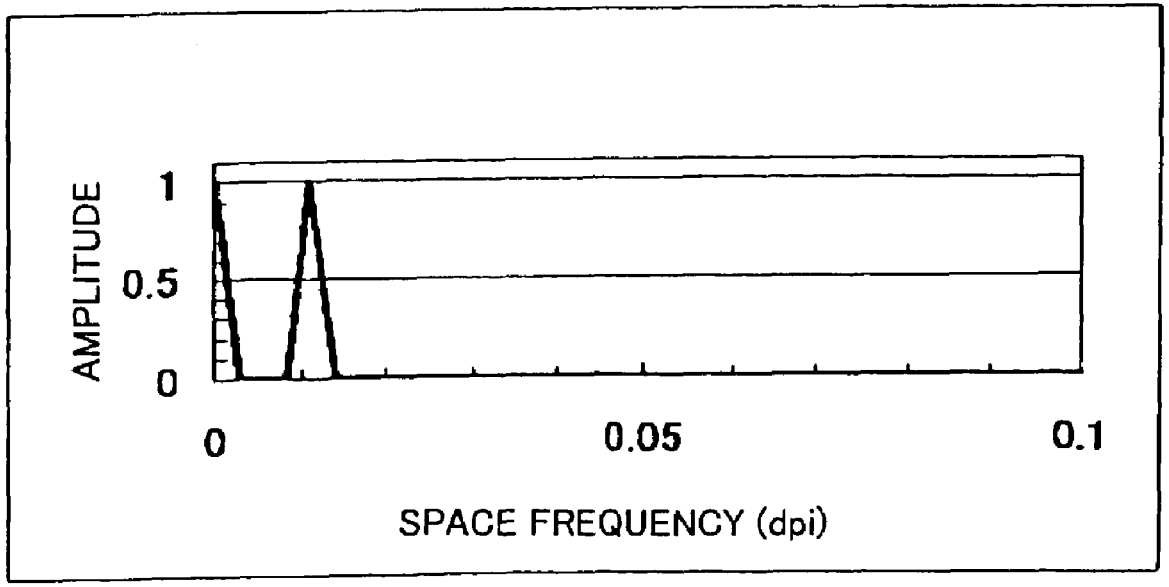
FIG. 14B is a diagram showing an example of discrete Fourier transform with respect to the projected waveform or histogram of the reference image in FIG. 14A.
Figure 15A:
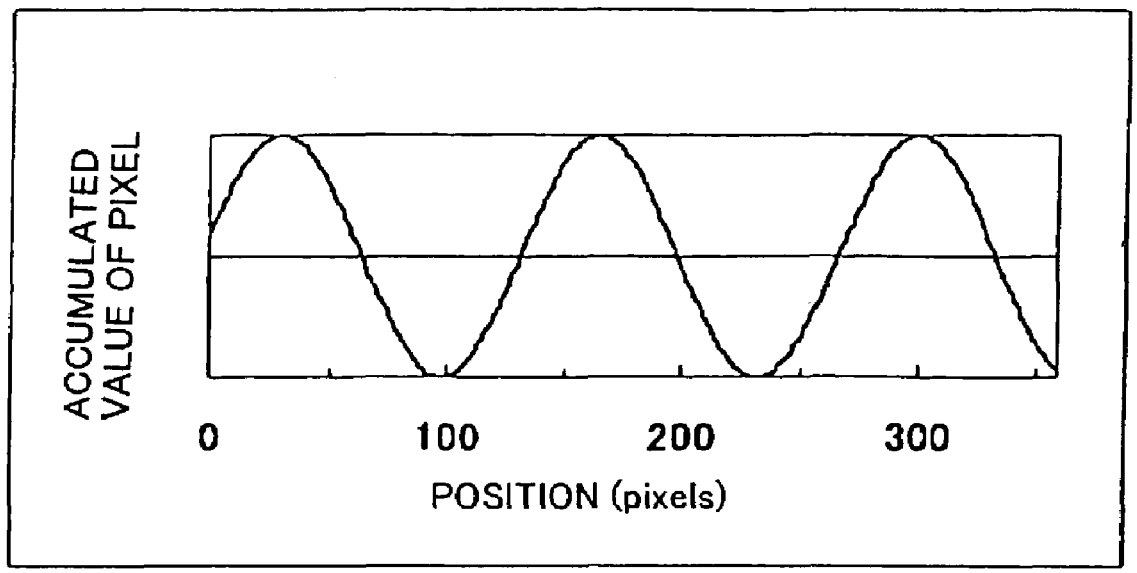
FIG. 15A is a diagram showing an example of a projected waveform or histogram of the check image.
Figure 15B:
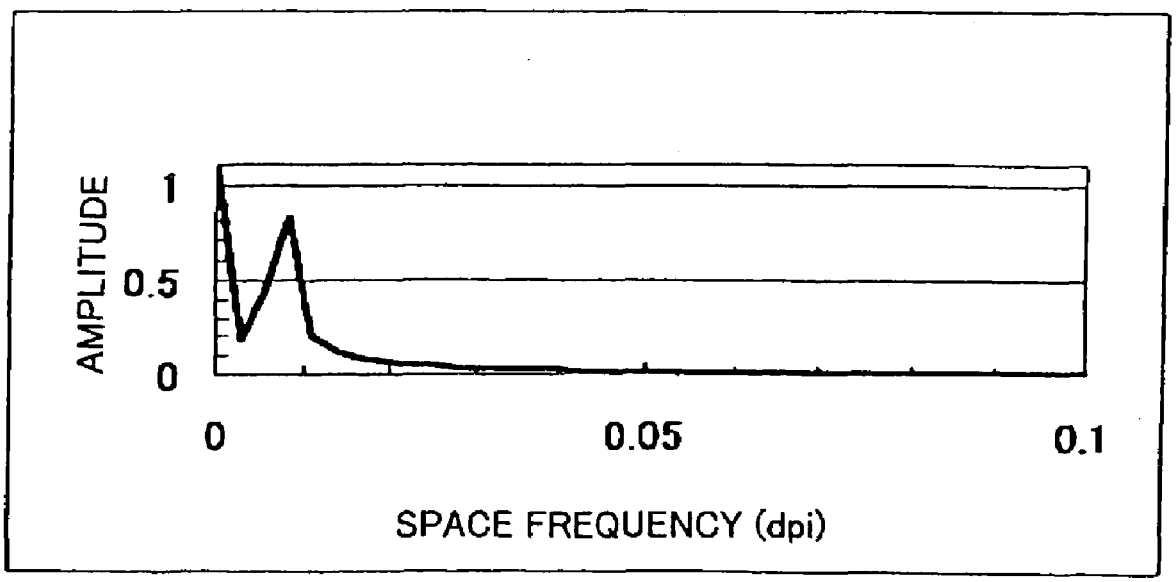
FIG. 15B is a diagram showing an example of a discrete Fourier transform of the projected waveform or histogram of the check image in FIG. 15A.

For example, when the projected waveform or histogram of the reference image is obtained as shown in FIG. 14A, the waveform is subjected to discrete Fourier transformation, and a result is obtained as shown in FIG. 14B. Similarly, when the projected waveform or histogram of the check image is obtained as shown in FIG. 15A, the waveform is subjected to the discrete Fourier transformation, and the result is obtained as shown in FIG. 15B.

Figure 16A:
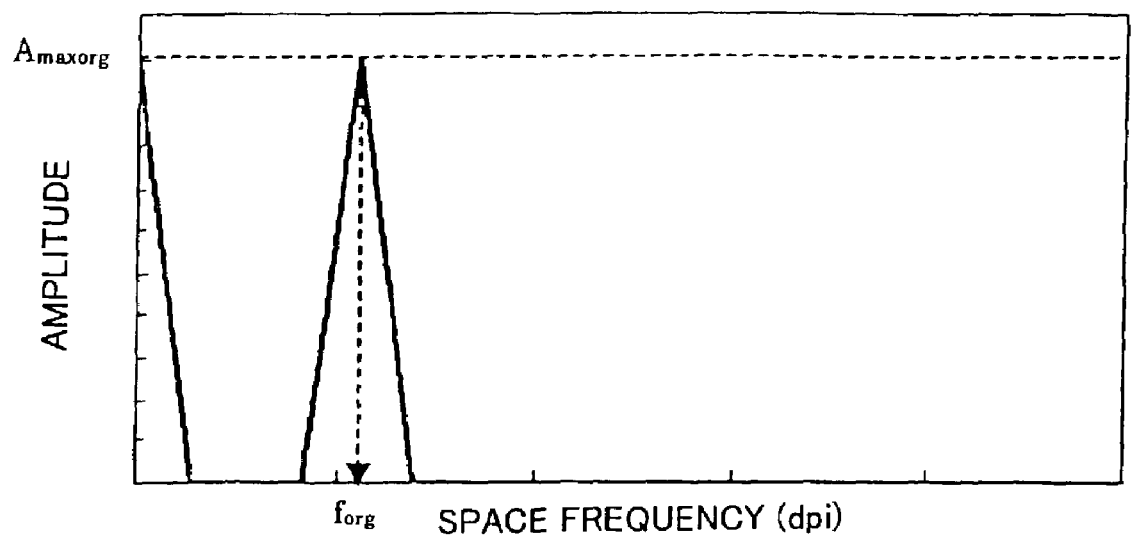
FIG. 16A is an explanatory view of an estimation method of the similarity transformation parameter using the discrete Fourier transform of the projected waveform or histogram.
Figure 16B:
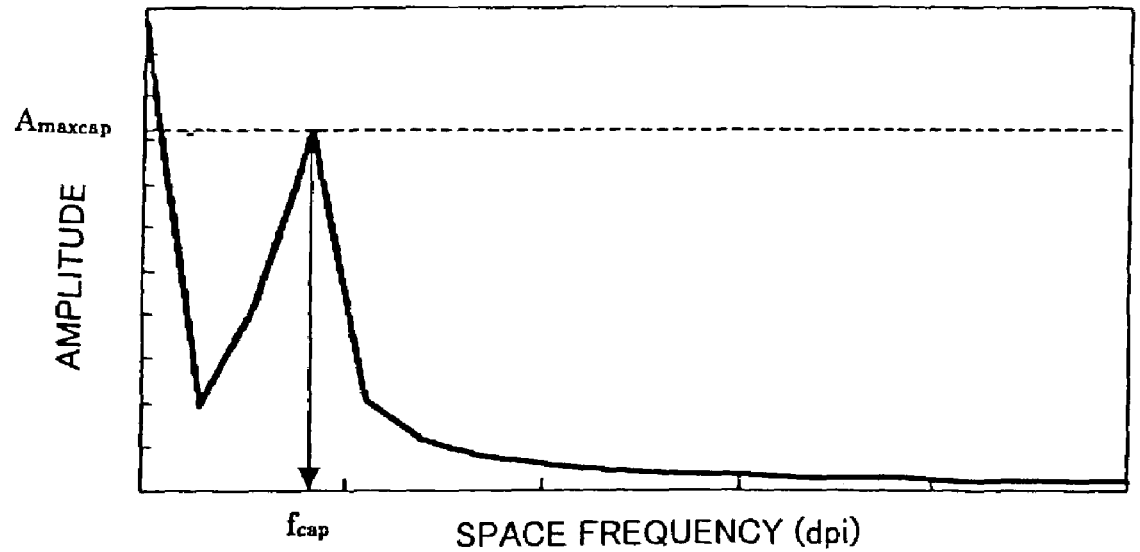
FIG. 16B is an explanatory view of an estimation method of the similarity transformation parameter using the discrete Fourier transform of the projected waveform or histogram.

FIG. 16 shows a method of obtaining the scaling amount k and parallel displacement amount s between the reference image and check image from the result of discrete Fourier transform. First, DC components are removed from the discrete Fourier transform on the reference image side and a maximized amplitude $A_{maxorg}$ is obtained. Moreover, it is assumed that a space frequency to the amplitude $A_{maxorg}$ is $f_{org}$, a phase to $f_{org}$ is $\theta_{org}$, and period is $L_{org}$. Similarly, the DC components are removed from the discrete Fourier transform on a check image side and a maximized amplitude $A_{maxcap}$ is obtained. Moreover, it is assumed that the space frequency to the amplitude $A_{maxcap}$ is $f_{cap}$, and the phase to $f_{cap}$ is $\theta_{cap}$.

At this point, the scaling amount k can be calculated by equation (20). Moreover, the parallel displacement amount s can be calculated by equation (21).

$$k = \frac{f_{org}}{f_{cap}} \quad (20)$$

$$s = \frac{\theta_{cap} - \theta_{org}}{2\pi} L_{org} \quad (21)$$

Subsequently, the similarity transformation parameter estimated by the above-described technique is used to compare the reference image with the check image.

[Constitution of Image Collating Apparatus and Each Unit Operation]

The operation principle of the embodiment of the present invention has been described above. The image collating apparatus of the present embodiment will next be described.

Figure 17:
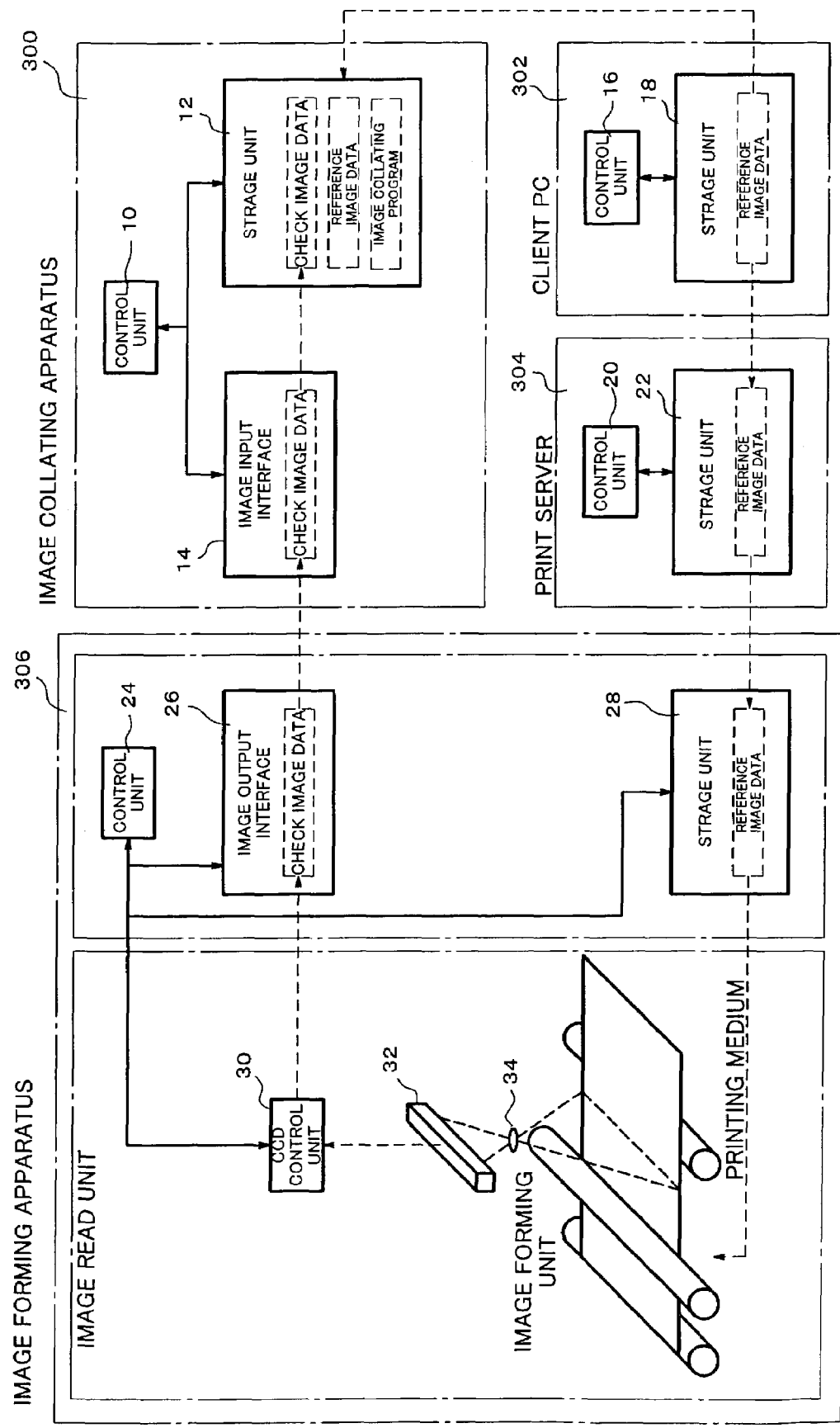
FIG. 17 is a block diagram of an image collating system according to an embodiment of the present invention.

As shown in FIG. 17, an image collating apparatus 300 of the present embodiment includes a control unit 10, storage unit 12, and image input interface 14. The control unit 10 is constituted of a microcomputer, and the control unit 10 executes an image collating program stored in the storage unit to operate.

The image collating apparatus 300 is connected to a client PC 302, print server 304, and image forming apparatus 306 via information transmission means such as a network so that information can be transmitted. The client PC 302 includes a control unit 16 and storage unit 18. The print server 304 includes a control unit 20 and storage unit 22. The image forming apparatus 306 includes a control unit 24, image output interface 26, storage unit 28, charge coupled device (CCD) control unit 30, line CCD 32, and capture optical system 34.

A user uses the client PC 302 to input or form the reference image as an object of image formation, and reference image data is stored in the storage unit 18. The control unit 16 transmits the reference image data stored in the storage unit 18 to the image collating apparatus 300 and print server 304. In the image collating apparatus 300, the received reference image data is stored in the storage unit 12. Similarly, in the print server 304, the received reference image data is stored in the storage unit 22.

The print server 304 receives a command for performing the image formation from the client PC 302, and transmits the reference image data stored in the storage unit 22 to the image forming apparatus 306 that the image is formed.

The image forming apparatus 306 receives an image formation command from the print server 304, stores the received reference image data in the storage unit 28, and forms the image based on the reference image data. The control unit 24 captures the image formed on a printing medium by the CCD control unit 30 from the line CCD 32, and transmits check image data to the image output interface 26. The image output interface 26 transmits the check image data to the image input interface 14 of the image collating apparatus 300.

The image collating apparatus 300 stores the received check image data in the storage unit 12, and executes collating processing with the reference image data already stored.

Figure 18:
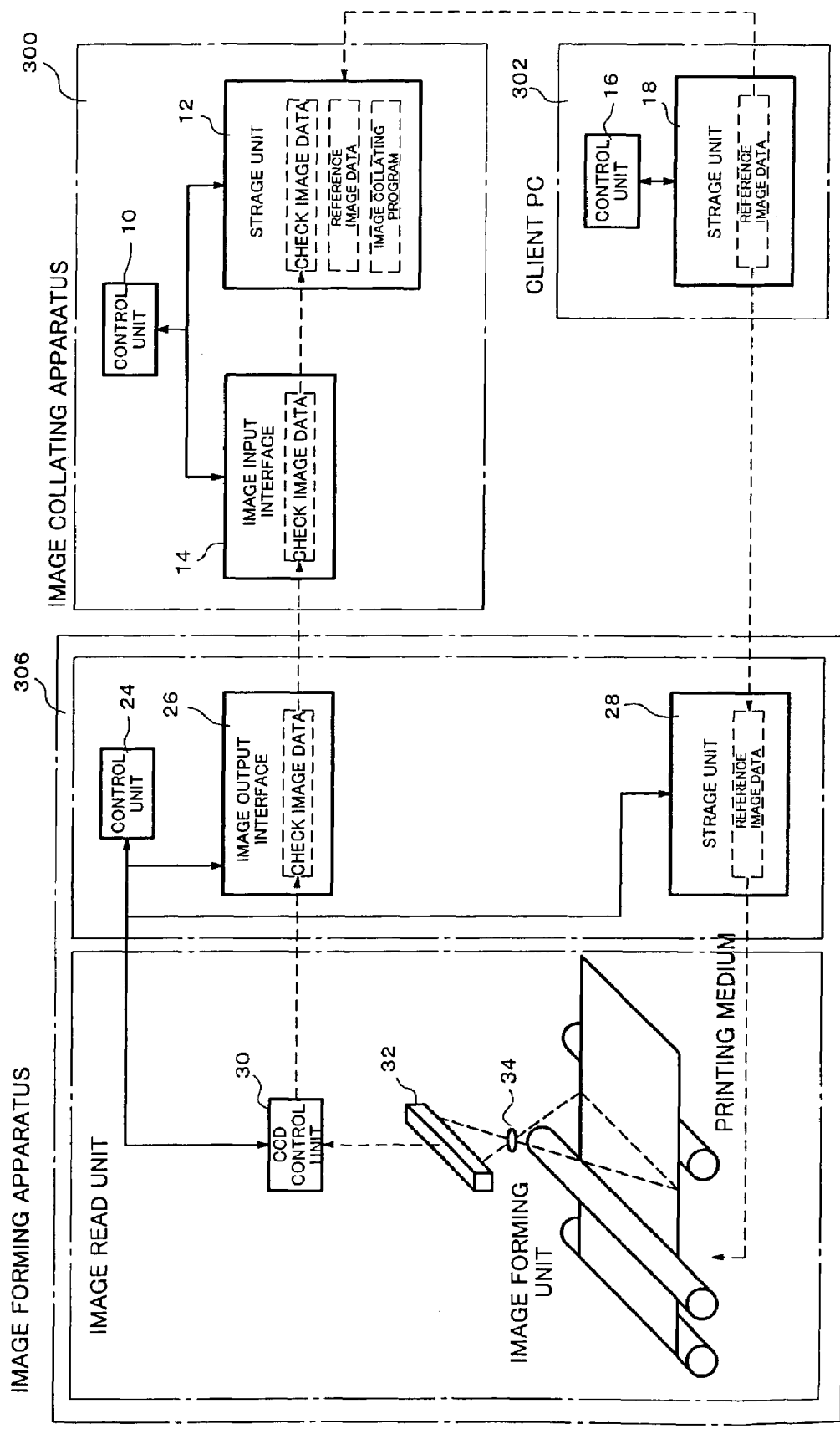
FIG. 18 is a block diagram of another image collating system according to the embodiment of the present invention.
Figure 19:
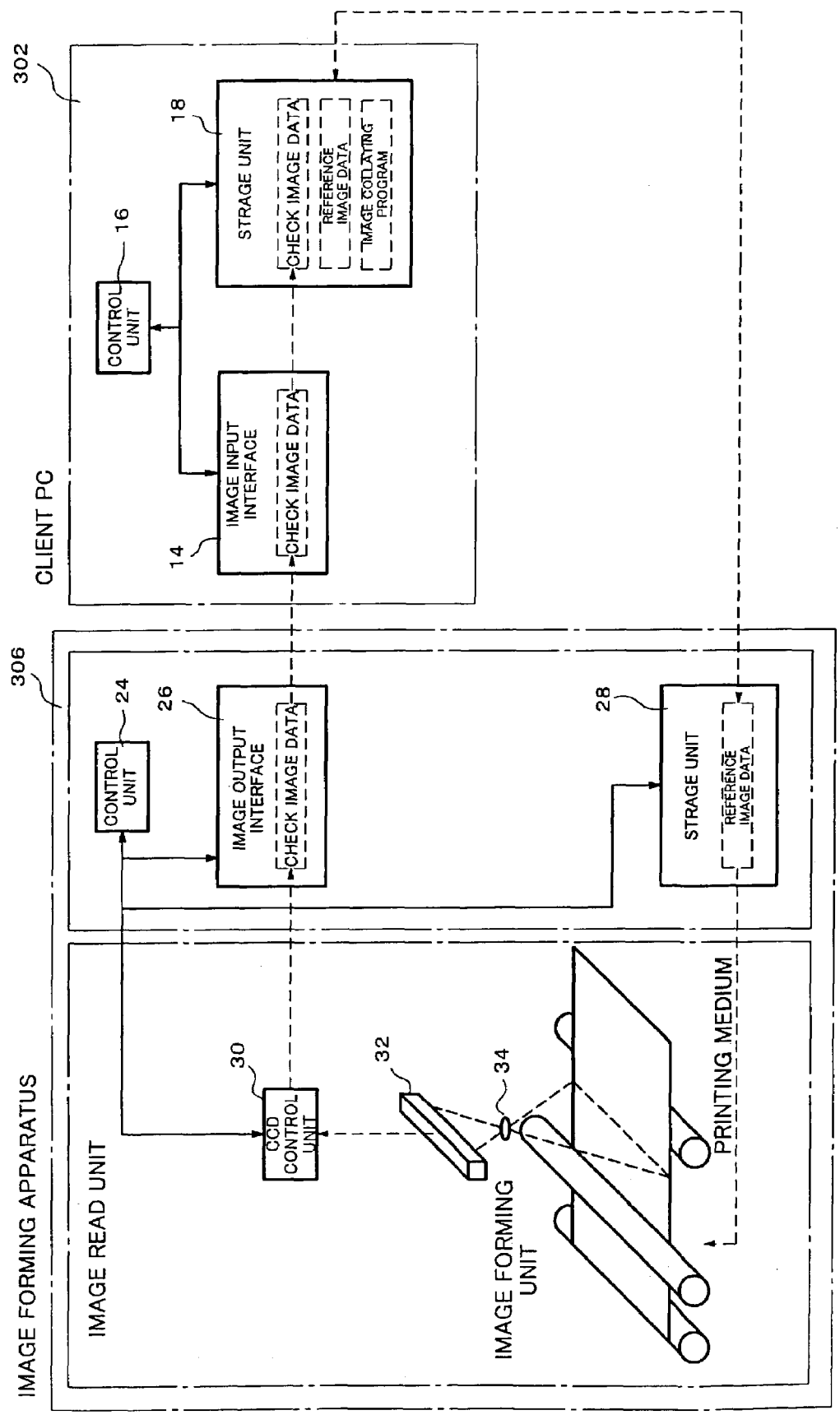
FIG. 19 is a block diagram of yet another image collating system according to the embodiment of the present invention.
Figure 20:
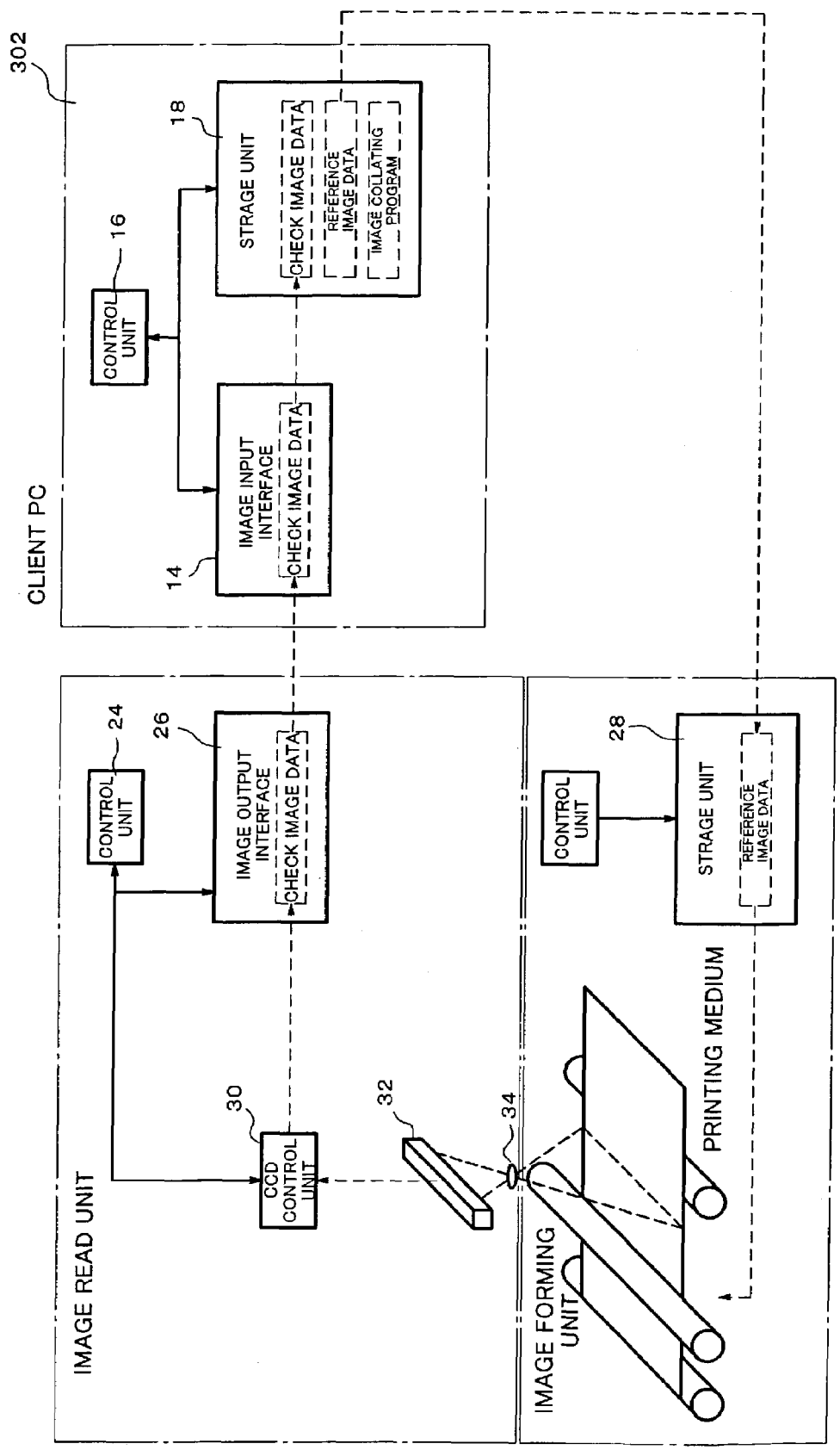
FIG. 20 is a block diagram of still another image collating system according to the embodiment of the present invention.

Another example of the embodiment of the present invention is shown in FIGS. 18 to 20. In FIG. 18, the print server 304 is not used, and the client PC 302 is directly connected to the image forming apparatus 306. In this example, the embodiment is applied to a case in which a personal computer is directly connected to a printer to form the image. FIG. 19 shows an example in which an image collating program is stored and held in the client PC 302 and image collating processing is executed. Because the processing of the client PC 302 and image collating apparatus 300 is executed by one computer, the constitution of the system can be simplified. FIG. 20 shows an example in which the image forming apparatus 306 is divided into an image forming unit and image capture unit. This configuration may be preferably used, for example, when a new image capture unit is separately attached to the existing printer and the image collating processing is executed.

Figure 21:
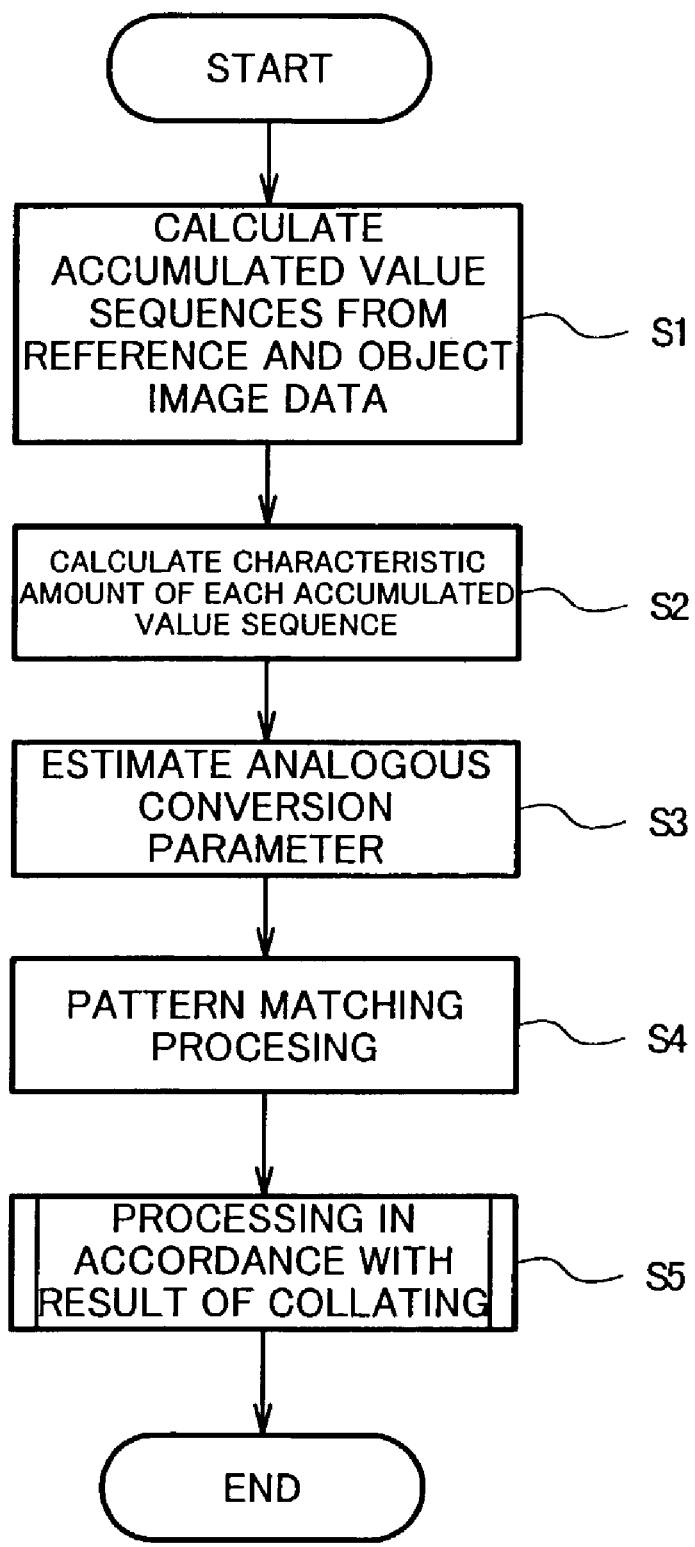
FIG. 21 is a flowchart showing one example of processing of image collation.

This collating processing will next be described. As shown in FIG. 21, the control unit 10 accumulates the pixel values along a plurality of predetermined paths with respect to both the reference image represented by the reference image data and the check image represented by the check image data, and obtains the projected waveforms or histograms of the reference image and check image obtained as a result (S1). When it is unnecessary to distinguish the projected waveform or histogram of the reference image from the projected waveform or histogram of the check image, these will be generically referred to as the "projected waveforms or histograms" hereinafter.

The path for accumulating the pixel values usually includes a plurality of paths along a conveyance direction (sub scanning direction) of a sheet, and a plurality of paths along a width direction (main scanning direction) with respect to the conveyance direction of the sheet. The differences of the enlargement/reduction ratios of the main and sub scanning directions and parallel displacements are corrected by two waveforms including each projected waveform or histogram along the path along the sub scanning direction (obtained by plotting a black pixel number with respect to the position of the sub scanning direction) and each projected waveform or histogram along the path along the main scanning direction (obtained by plotting the black pixel number with respect to the position of the main scanning direction).

The control unit 10 extracts the characteristic values from four projected waveforms or histograms including the projected waveforms or histograms of the reference and check images of the main scanning direction and the projected waveforms or histograms of the reference and check images of the sub scanning direction (S2). Here, for the sake of simplicity of explanation and ease of understanding, an example in which the characteristic value is in the peak position (peak and trough) will be described. The control unit 10 compares the peak positions to estimate the similarity transformation parameter by the voting processing (S3). Concretely, the similarity transformation parameter of the main scanning direction is estimated from the peak positions of the projected waveforms or histograms of the reference and check images of the main scanning direction. Moreover, the similarity transformation parameter of the sub scanning direction is estimated from the peak positions of the projected waveforms or histograms of the reference and check images of the sub scanning direction. Examples of similarity transformation parameters include the scaling amount (correction of the enlargement/reduction ratio) and parallel displacement amount (correction of parallel displacement) as described above.

Because there are scale differences and parallel displacements between the reference image and check image as described above, the position of the corresponding pixel between both the image data is obtained using the scaling amount and parallel displacement amount as the similarity transformation parameters.

The control unit 10 obtains the positions of the corresponding pixels of the reference and check images from the similarity transformation parameters with respect to the main and sub scanning directions, compares the pixel values to perform a pattern matching check (S4), executes predetermined processing in accordance with the result of the pattern matching check (S5), and ends the processing.

As another method, the control unit 10 analogously converts (Affin transformation) at least one of the reference and check images by the similarity transformation parameters with respect to the main and sub scanning directions, and correspongds the pixel positions of both the image data. Subsequently, the control unit may compare the values of the pixels of the corresponding positions of both the image data to perform the pattern matching check (S4), execute the predetermined processing in accordance with the result of the pattern matching check (S5), and end the processing.

With the present embodiment, because the characteristic values such as the peak positions of the projected waveforms or histograms are compared to obtain the transformation parameter, the transformation parameter can exactly be obtained without being influenced by the noises.

[Block Division]

It should be understood that parallel displacement amount or variable magnification of a printed matter is not necessarily uniform over the entire imagining area, such as the entire surface of a sheet of paper. It is therefore also preferable to divide the reference and check image into blocks and to subsequently subject each block to the collating processing shown in FIG. 21.

That is, in this example of the present embodiment, the control unit 10 divides the stored reference image into m×n (m, n are positive integers) blocks before starting the processing of FIG. 21. When dividing, consideration is given to the fact that the parallel displacement and fluctuation of the enlargement/reduction ratio of the conveyance direction of the sheet (sub scanning direction) are larger than those of the width direction (main scanning direction) with respect to the conveyance direction of the sheet, and the image is divided into m blocks in the main scanning direction and into n blocks in the sub scanning direction (m<n). The mode of dividing may also be m=n, or m>n, and can be determined in accordance actual conditions.

The control unit 10 also divides the input check image into m×n blocks. Subsequently, the unit executes the collating processing shown in FIG. 21 (estimation of the similarity transformation parameter, processing of pattern matching check; steps S1 to S4) between each of m×n blocks of the check image and the corresponding block of the reference image. Moreover, the predetermined processing (step S5) is executed in accordance with the result of the collating performed with respect to each block.

[Operation]

An operation of the image collating apparatus according to the present embodiment will next be described. The control unit 20 divides the externally input reference image data into m×n blocks and stores the data in blocks. Moreover, the unit divides the check image data input from the image forming apparatus into the m×n blocks and also stores this data in block units.

The control unit 10 starts the collating processing shown in FIG. 21 with respect to each block of the reference image, and the block of the check image corresponding to the block of the reference image. That is, with respect to two image data blocks in the corresponding positions in the whole two image data of the reference and check images, the projected waveforms or histograms of the main and sub scanning directions are prepared.

Figure 22:
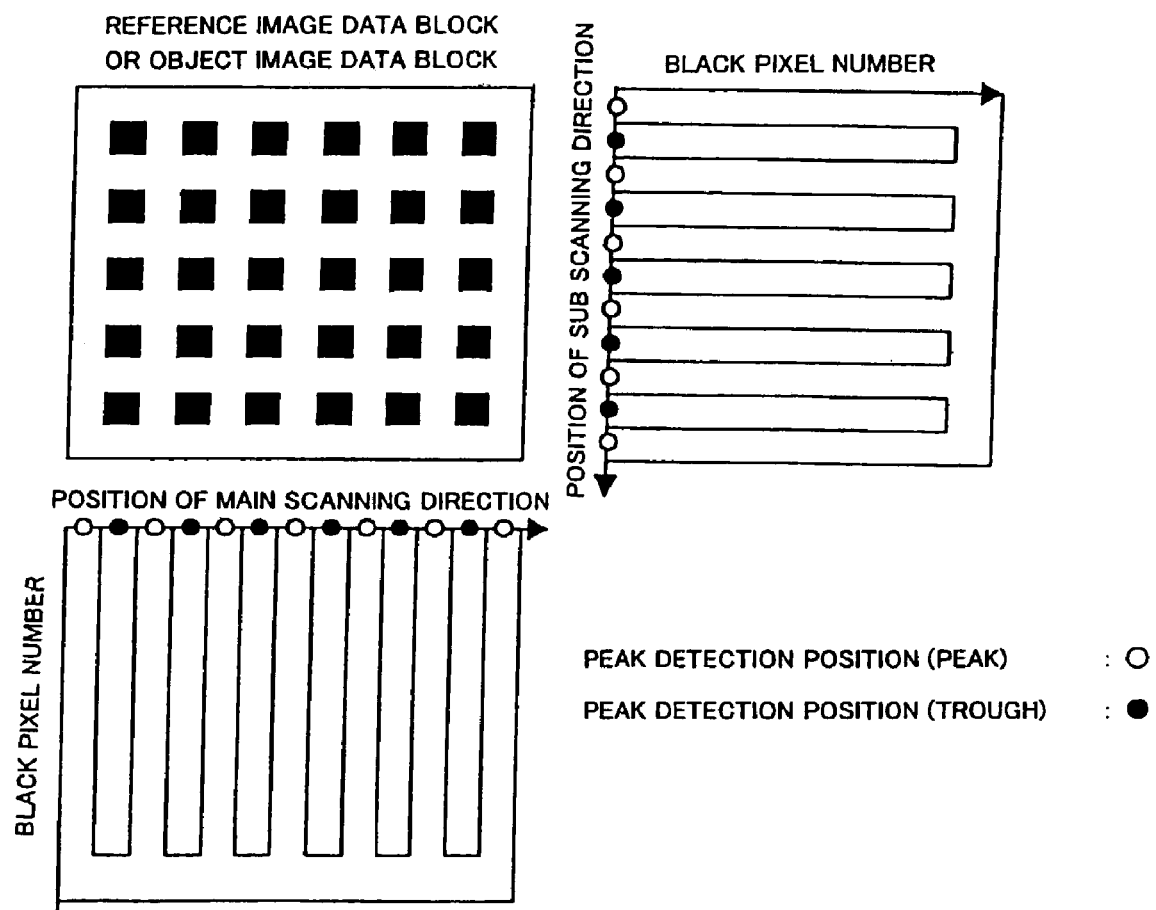
FIG. 22 is an explanatory view showing one example of image data and one example of the corresponding projected waveform or histogram.

For example, after the image shown in FIG. 22 is input as the reference or check image block, the black pixel numbers plotted with respect to the positions of the main and sub scanning directions are prepared.

Subsequently, the control unit 10 extracts the respective characteristic values from these four projected waveforms or histograms. Here, as shown in FIG. 22, it is assumed that the peak positions (peaks and troughs) are extracted as the characteristic values. Through the above-described voting processing (by applied processing of Hough transformation), the parallel displacement amount and variable magnification of the main scanning direction are obtained from the peak positions of the reference and check image blocks of the main scanning direction. Similarly, the parallel displacement amount and variable magnification of the sub scanning direction are obtained from the peak positions of the sub scanning direction of the reference and check image blocks.

Here, examples of specific content of the voting processing will next be described with reference to the drawing. In the following, the peak positions of peaks of the reference image blocks are assumed to be $a_0$, $a_1$ ..., the peak positions of the troughs are $b_0$, $b_1$, ..., the peak positions of the peaks of the check image blocks are $c_0$, $c_1$, ..., and the peak positions of the troughs are $d_0$, $d_1$, ... At this time, when the equation (1) is applied with respect to the reference and check image blocks, $c_j = k \cdot a_i + s$ is obtained. With respect to the peak positions as the troughs, $d_j = k \cdot b_i + s$ is obtained from the equation (1). It is here assumed that the check image deviates from the reference image by s pixels, and has an scaling amount of k.

When these equations are transformed into the following equation (22), the parallel displacement amount can be represented as a linear function of an scaling amount. That is, it is seen that the parallel displacement amounts and variable magnifications to be corresponded exist on the function represented by the equation (22). This is an application of the concept of Hough transformation.

$$s = -k \times a_0 + c_0 \quad (22)$$

In Hough transformation, to detect the line from the image, assuming that an inclination is $\alpha$ and a intercept is $\beta$, the line having a possibility of passing through the point on the image can be represented as follows.

$$y_0 = a x_0 + \beta$$

The present embodiment corresponds to an embodiment in which the inclination $\alpha$ in the Hough transformation is replaced with the scaling amount k and the intercept $\beta$ is replaced with the parallel displacement amount s.

When the respective peak positions are corresponded, and there are assumed to be, for example, p peak positions a as the peaks from the reference image blocks, and q peak positions c as the peaks of the check image blocks, ideally (when there is not noise in the check image) p=q is obtained, and the respective peak positions are successively corresponded. By the equation (20), p (=q) lines can be drawn in the s-k plane, and the parallel displacement amount s and scaling amount k can be determined as intersections of these lines (i.e., as a solution of a simultaneous equation of the equation (22) based on each peak position).

However, because in actuality the image noise (deletion, dirt, thickness) in the check image block appears at random, the list of the peak positions of the projected waveforms or histograms with respect to the check image blocks extracted as the characteristic values cannot simply be corresponded with the list of the peak positions with respect to the reference image blocks, and it can only be assumed that the peak position simply correspond to $a_0$ is any one of $c_0$, $c_1$, ....

Then, in the peak position lists with respect to the reference and check image blocks, the line of equation (22) is obtained with respect to all the combinations of the respective peak positions. That is, when there are p peak positions a as the peaks from the reference image blocks and q peak positions c as the peaks of the check image blocks, p×q lines can be drawn in the s-k plane.

Therefore, different from the ideal case, even the line which does not pass through the true solution is drawn in the s-k plane, and the intersection as the true solution cannot be specified in this state.

Figure 23:
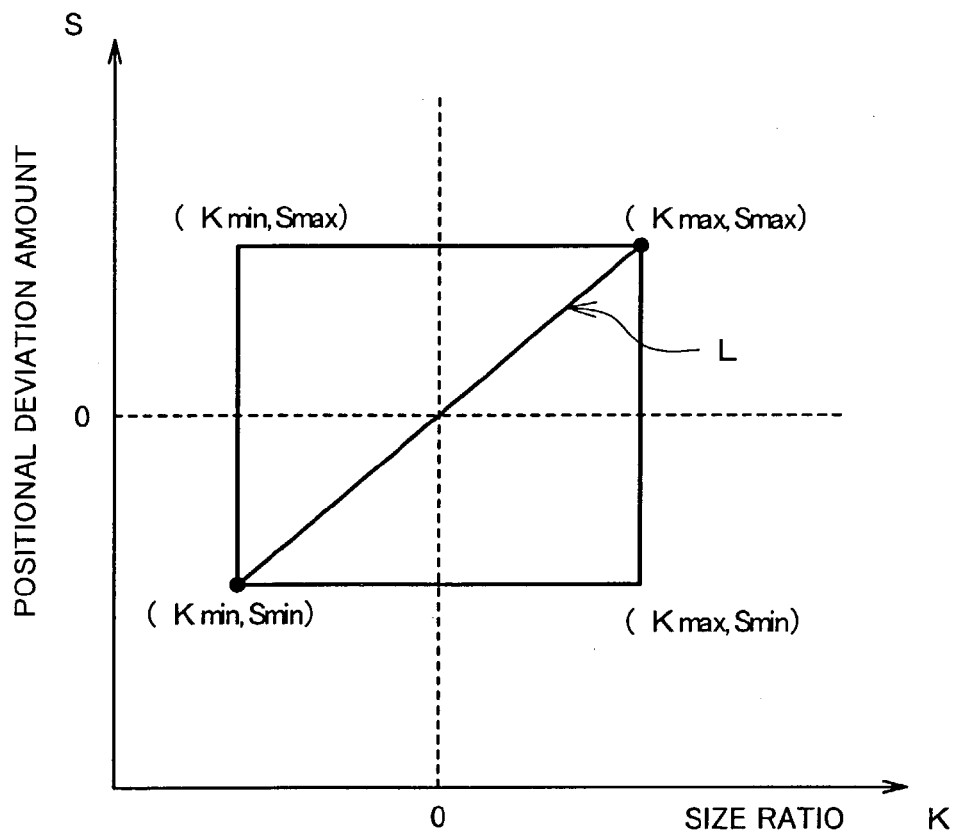
FIG. 23 is an explanatory view showing one example of an optimized rectangular region and an optimized line segment.

To obtain the true solution based on these lines (linear function) using the computer, in the present embodiment it is first assumed that there are limitations in the parallel displacement amount s and scaling amount k, s is not less than smin, not more than smax, and k is not less than kmin, not more than kmax. That is, as shown in FIG. 23, it can be judged that a line not passing through a rectangular region (hereinafter referred to as "optimized rectangular region") defined by (kmin, smax) and (kmax, smin) in the s-k plane is not significant in terms of obtaining the true solution. To perform this criterion by the computer, k and c are positive numbers from the equation (22), and therefore all the lines drawn in the s-k plane by the equation (22) are lines in which s decreases with an increase of k. Then, (kmin, smin) and (kmax, smax) are set to opposite ends so that s increases with the increase of k. A half line L connecting these ends (line having the opposite ends; hereinafter referred to as an "optimized line segment") is drawn in the s-k plane as shown in FIG. 23. Then, by judging whether or not the optimized line segment intersects with each line obtained by the equation (22), it can be judged whether or not the line passes through the rectangular region. Thereby, calculation efficiency and precision are enhanced.

The control unit 10 divides the optimized rectangular region into a plurality of voting cells as shown in FIG. 10 with respect to the equation of the line which intersects with the optimized line segment. Here, the height (parallel displacement direction) and width (scaling amount direction) of each voting cell are as represented by the following equations (23)-(24):

$$h \geq 1, \text{ and} \quad (23)$$

$$\omega \geq \min\left\{\frac{W}{W-1} - 1, 1 - \frac{W-1}{W}\right\}, \quad (24)$$

wherein W denotes total pixel numbers of the main and sub scanning directions of the image data blocks, and min {•} indicates that a minimum value is selected from {•}. For example, when W=300, min{0.00334448, 0.00333333} is indicated, therefore 0.3333... is selected, and w indicates not less than 0.333... Moreover, the "voting" is performed by judging whether or not the line passes through each voting cell, and the parallel displacement amount s and scaling amount k are determined by s, k corresponding to the cell which has a maximum number of votes.

Furthermore, in the present embodiment, similar processing is also executed with respect to the peak positions as the troughs in order to enhance the precision. It is also preferable to obtain a cell having the maximum number of votes from the number of votes obtained by totaling both the numbers of votes by the peak positions as the peaks and as the troughs. Additionally, the scaling amount and parallel displacement amount of the sub scanning direction are also performed by similar processing.

Although in the above description, scaling amount and parallel displacement amount are calculated by the applied technique of Hough transformation, DP matching may be employed instead. That is, the scaling amount and parallel displacement amount may also be obtained from a mapping of DP matching.

When the scaling amount and parallel displacement amount are obtained in this manner, the positions of the corresponding pixels of the reference and check images may be obtained based on these from the scaling amount and parallel displacement amount, and thereafter the image data are collated with each other.

Moreover, although in the above description lists of peak positions are used as the characteristic values, the method may comprise subjecting the projected waveform or histogram to Fourier transform; obtaining the scaling amount from a ratio of frequency having a maximum spectrum in the step S3; and obtaining the parallel displacement amount from a phase in which the spectrum is maximized.

[Pattern Matching]

It has been described that the pattern matching processing is performed in the step S4 of FIG. 21 in the same manner as in the prior art. However, when the corresponding pixels of actual sets of image data are compared after preprocessing, the scaling amount and parallel displacement amount for use in the preprocessing include errors, and the positions of the pixels of both the image data are unlikely to agree with each other. To solve the problem, in this example of the present embodiment, after the positions of the corresponding pixels of the reference and check images are obtained from the scaling amount and parallel displacement amount, the pixels of one image data are successively selected as noted pixels, and the pixel values of the noted pixels and pixels in the vicinity of the noted pixels are compared with the pixel values of the corresponding positions of the other image data to execute the pattern matching processing.

For example, when the printing unit 12 performs printing of a monochromatic image, collating errors are frequently generated by deletions (failure in forming black dots) or black dirt (bleeding or flying of black toner into a dot not to be printed).

Figure 24:
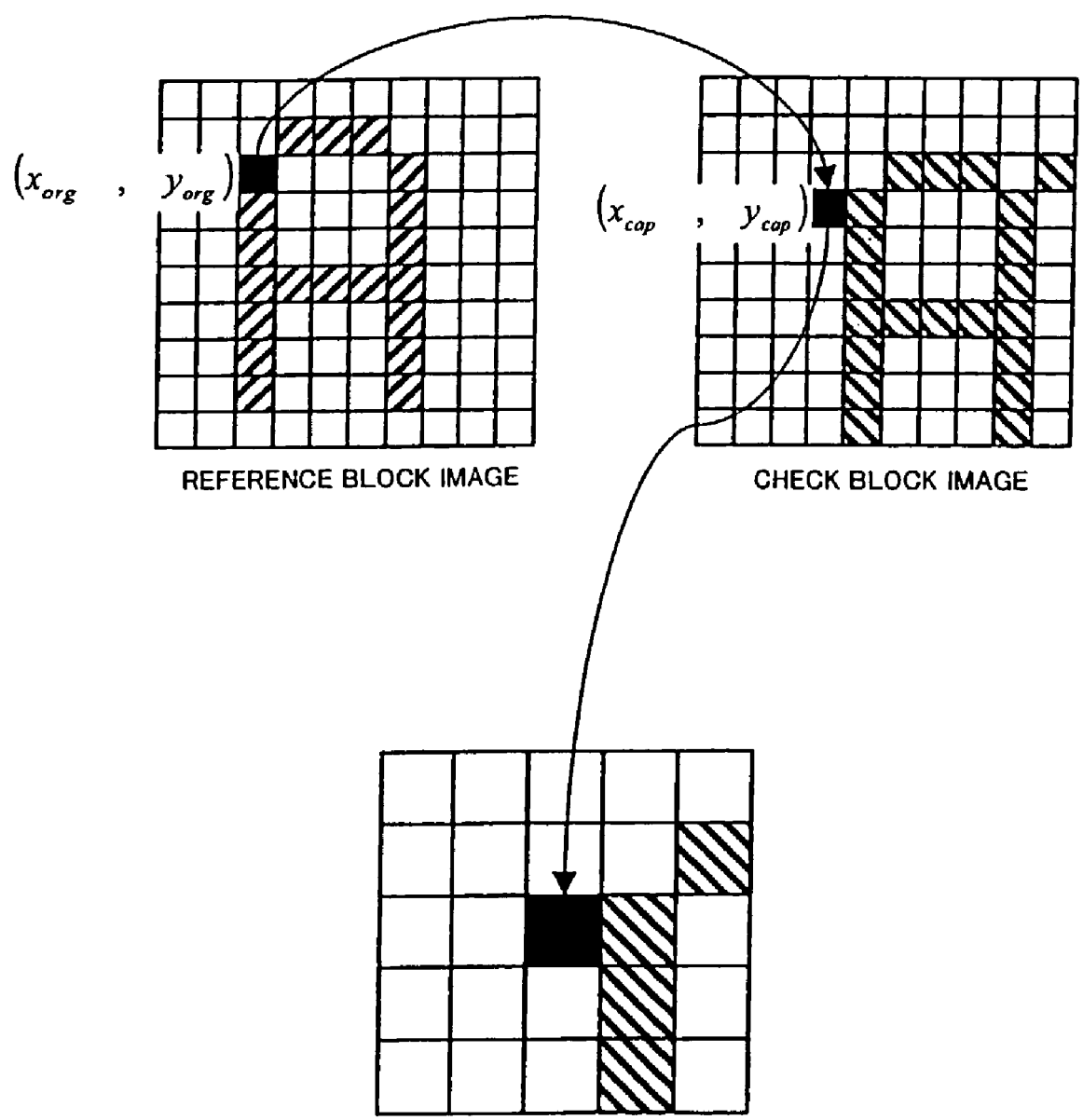
FIG. 24 is an explanatory view showing a criterion method of a deletion pixel.

More simply, a deletion is a phenomenon in which the black pixels existing in the reference image are not reproduced on the check image. To solve the problem, as shown in FIG. 24, the coordinate of the black pixel $(x_{org}, y_{org})$ on the reference block image is corrected using the scaling amount and parallel displacement amount, and pixel $(x_{cap}, y_{cap})$ on the check block image corresponding to the pixel is successively selected as the noted pixel. When there is no black pixel in a peripheral range of 5 pixels×5 pixels centered on the noted pixel, the pixels are treated as deletion pixels. Conversely, when even one black pixel exists in the peripheral range of 5 pixels×5 pixels, the pixels are not treated as deletion pixels.

Figure 25:
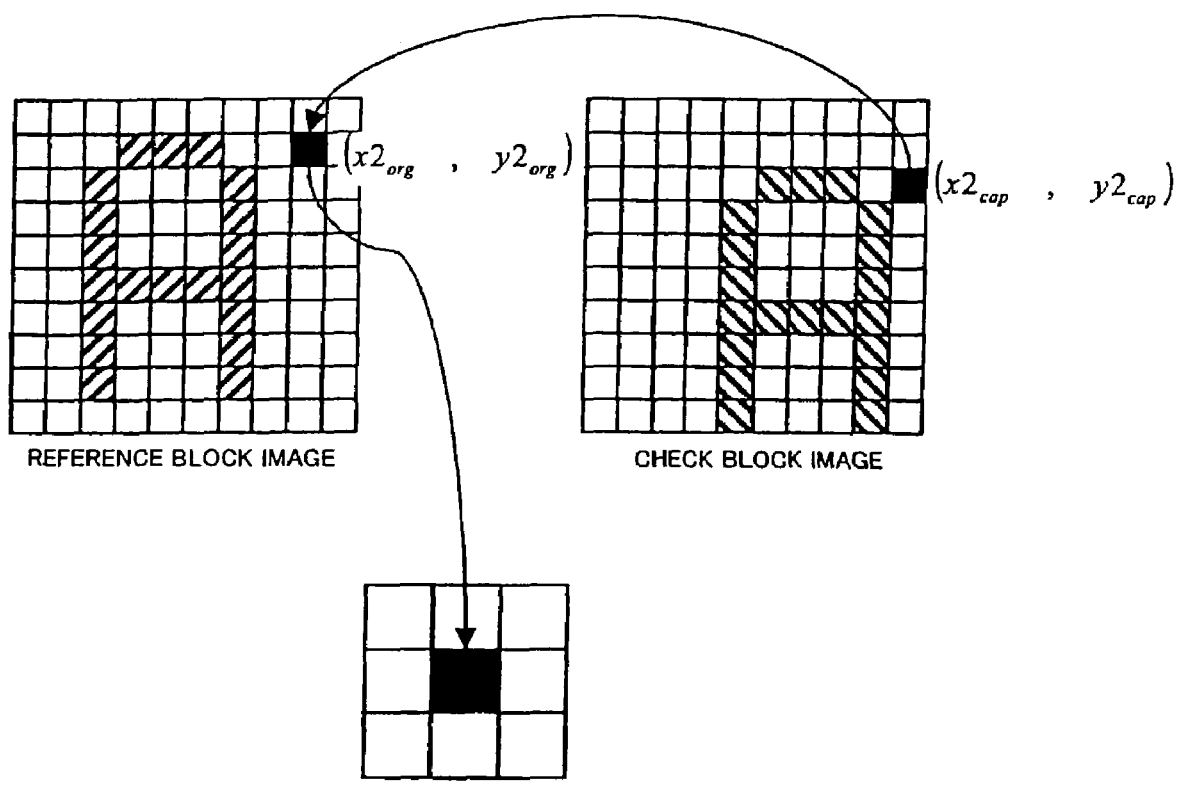
FIG. 25 is an explanatory view showing a criterion method of a black dirt pixel.

Black dirt is a phenomenon in which a black pixel not existing in the reference image is formed on the check image. To solve this problem, as shown in FIG. 25, the coordinate of the black pixel $(x2_{cap}, y2_{cap})$ on the check block image is corrected using the scaling amount and parallel displacement amount, and the pixel $(x2_{org}, y2_{org})$ on the reference block image corresponding to the pixel is successively selected as the noted pixel. When there is no black pixel in the peripheral range of 3 pixels×3 pixels centering on the noted pixel, the pixels are treated as black dirt pixels. Conversely, when even one black pixel exists in the peripheral range of 3 pixels×3 pixels, the pixels are not treated as black dirt pixels.

It is also preferable to appropriately adjust the number of pixels to be taken in the periphery of the noted pixel in accordance with density (blackness) of an image (original) to be formed.

[Predetermined Processing after Collating]

Moreover, as an example of predetermined processing corresponded with step S5, warning processing indicating a failure in collating may be preferably executed. Concretely, the control unit 10 counts the number of detected deletions or black dirt portions in step S4, and judges whether or not the detected number of deletions exceeds a first predetermined threshold value. When the number does not exceed the first threshold value, the unit further judges whether or not the number of detected black dirt portions exceeds a second predetermined threshold value. When the number does not exceed the second threshold value, it is judged that the collating is successful, and the processing is ended.

Figure 26:
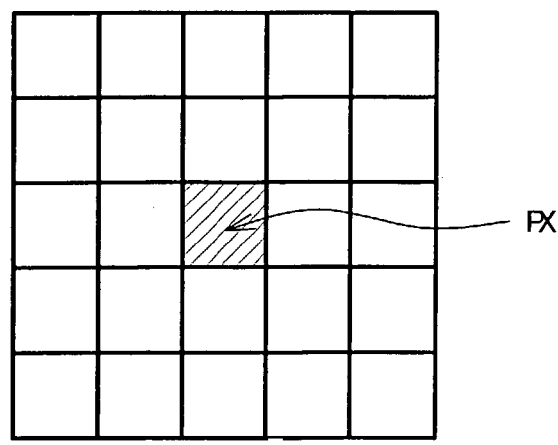
FIG. 26 is a diagram showing an example of a difference image created from the reference image and check image.

However, when the number of detected deletions exceeds the first threshold value, or the number of detected black dirt portions exceeds the second threshold value, it is judged that collating has failed, and a printing abnormality is reported to the user. For example, when an abnormality of the printing is detected, as shown in FIG. 26, a difference image between the reference and check images may also be calculated and provided to the user. Moreover, when collating has failed, the control unit 10 may also control a sheet conveyance unit 13 so as to convey a sheet as an origin of the check image which has failed in the collating along another path and accumulate the sheet in a place (accumulation place of sheets which have failed in the printing) different from a predetermined stacking place. Further in this case, when the printing unit 12 prints a plurality of copies from the same stock, it is preferable to instruct addition of another printing sheet.

Additionally, when the number of accumulated or consecutive collating failures exceeds a predetermined value, the printing may be stopped, and the user may be advised to inspect the abnormality of the apparatus.

What is claimed is:

1. An image collating apparatus which collates a reference image as a criterion with a check image obtained by subjecting the reference image to predetermined processing, comprising:

a reference image obtaining unit that obtains the reference image as a printing object before the printing object is printed on a medium;

a first accumulation unit that sets a plurality of predetermined paths in the reference image, and accumulates pixel values in the paths with respect to the plurality of paths to obtain a projected waveform or histogram of the reference image;

a check image obtaining unit that obtains the check image as the printing object on the medium after the printing object is printed on the medium;

a second accumulation unit that sets the plurality of predetermined paths in the check image, and accumulates the pixel values in the paths with respect to the plurality of paths to obtain the projected waveform or histogram of the check image;

a first information extraction unit that extracts information of a characteristic value as reference characteristic value information from the projected waveform or histogram of the reference image;

a second information extraction unit that extracts information of the characteristic value as check characteristic value information from the projected waveform or histogram of the check image; and a collation unit that collates the reference image with the check image based on the reference characteristic value information and check characteristic value information, wherein the reference characteristic value information is information indicating a position on the projected waveform or histogram where a change of the accumulated value is characteristic in the reference projected waveform or histogram, the check characteristic value information is information indicating a position on the projected waveform or histogram where the change of the accumulated value is characteristic in the check projected waveform or histogram, the collation unit collates the reference image with the check image so as to obtain similarity based on the reference characteristic value information and check characteristic value information, the reference characteristic value information is compared with the check characteristic value information to obtain a similarity transformation parameter including a parallel displacement amount, and the similarity transformation parameter is used to measure the similarity between the reference image and check image, and to obtain the similarity transformation parameter, a predetermined range of scaling margin is set to at least one amount included in the similarity transformation parameter, and the similarity transformation parameter is determined from the range of scaling margin.

2. The image collating apparatus according to claim 1, wherein the position on the projected waveform or histogram where the change of the accumulated value is characteristic is a peak position on the projected waveform or histogram.

3. The image collating apparatus according to claim 2, wherein the reference characteristic value information and check characteristic value information are referred to, a similarity transformation parameter is estimated with respect to a combination of the peak positions of the projected waveforms or histograms of the reference and check images, an estimated similarity transformation parameter group including the similarity transformation parameter estimated for each combination is generated, and a parameter with maximum likelihood value is determined as the similarity transformation parameter in the estimated similarity transformation parameter group.

4. The image collating apparatus according to claim 1, wherein the position on the projected waveform or histogram where the change of the accumulated value is characteristic is a position at which a differential value of n-dimensional differentiating of the projected waveform or histogram is 0.

5. The image collating apparatus according to claim 1, wherein the reference image obtaining unit that obtains the projected waveform or histogram of the reference image divides the reference image into m×n blocks (m, n are positive integers) to obtain a plurality of reference image blocks, sets a plurality of predetermined paths in at least one of the reference image blocks, and accumulates the pixel values in the paths with respect to the plurality of paths to obtain the projected waveform or histogram of the reference image, and the check image obtaining unit that obtains the projected waveform or histogram of the check image divides the check image into m×n blocks (m, n are positive integers) to obtain a plurality of check image blocks, sets a plurality of predetermined paths in at least one of the check image blocks, and accumulates the pixel values in the paths with respect to the plurality of paths to obtain the projected waveform or histogram of the check image.

6. The image collating apparatus of claim 1, further comprising a printing unit that prints the reference image on the medium, wherein the check image obtaining unit obtains the check image from the reference image printed on the medium.

7. An image forming apparatus which forms a reference image as a criterion, and an image based on the reference image, comprising:

an image collating device that collates images, the image collating device including:

a reference image obtaining unit that obtains the reference image as a printing object before printing;

a first accumulation unit that sets a plurality of predetermined paths in the reference image, and accumulates pixel values in the paths with respect to the plurality of paths to obtain a projected waveform or histogram of the reference image;

a check image obtaining unit that obtains the formed image as a check image, the check image is the reference image printed and fixed on a medium;

a second accumulation unit that sets the plurality of predetermined paths in the check image, and accumulates the pixel values in the paths with respect to the plurality of paths to obtain the projected waveform or histogram of the check image;

a first information extraction unit that extracts information of a characteristic value as reference characteristic value information from the projected waveform or histogram of the reference image;

a second information extraction unit that extracts information of the characteristic value as check characteristic value information from the projected waveform or histogram of the check image; and a collation unit that collates the reference image with the check image based on the reference characteristic value information and check characteristic value information, wherein the reference characteristic value information is information indicating a position on the projected waveform or histogram where a change of the accumulated value is characteristic in the reference projected waveform or histogram, the check characteristic value information is information indicating a position on the projected waveform or histogram where the change of the accumulated value is characteristic in the check projected waveform or histogram, the collation unit collates the reference image with the check image so as to obtain similarity based on the reference characteristic value information and check characteristic value information, the reference characteristic value information is compared with the check characteristic value information to obtain a similarity transformation parameter including a parallel displacement amount, and the similarity transformation parameter is used to measure the similarity between the reference image and check image, and to obtain the similarity transformation parameter, a predetermined range of scaling margin is set to at least one amount included in the similarity transformation parameter, and the similarity transformation parameter is determined from the range of scaling margin.

8. The image forming apparatus of claim 7, further comprising a printing unit that prints the reference image on the medium, wherein the check image obtaining unit obtains the check image from the reference image printed on the medium.

9. An image collating method for collating a reference image as a criterion with a check image obtained by subjecting the reference image to predetermined processing, comprising:

obtaining the reference image as a printing object before the printing object is printed on a medium;

setting a plurality of predetermined paths in the reference image, and accumulating pixel values in the paths with respect to the plurality of paths to obtain a projected waveform or histogram of the reference image;

obtaining the check image as the printing object on the medium after the printing object is printed on the medium;

setting the plurality of predetermined paths in the check image, and accumulating the pixel values in the paths with respect to the plurality of paths to obtain the projected waveform or histogram of the check image;

extracting information of a characteristic value as reference characteristic value information from the projected waveform or histogram of the reference image;

extracting information of the characteristic value as check characteristic value information from the projected waveform or histogram of the check image; and collating the reference image with the check image based on the reference characteristic value information and check characteristic value information, wherein the reference characteristic value information is information indicating a position on the projected waveform or histogram where a change of the accumulated value is characteristic in the reference projected waveform or histogram, the check characteristic value information is information indicating a position on the projected waveform or histogram where the change of the accumulated value is characteristic in the check projected waveform or histogram, the collating step collates the reference image with the check image so as to obtain similarity based on the reference characteristic value information and check characteristic value information, comparing the reference characteristic value information with the check characteristic value information to obtain a similarity transformation parameter including a parallel displacement amount, and using the similarity transformation parameter to measure the similarity between the reference image and check image, and to obtain the similarity transformation parameter, setting a predetermined range of scaling margin to at least one amount included in the similarity transformation parameter, and determining the similarity transformation parameter from the range of scaling margin.

10. The image collating method according to claim 9, wherein obtaining the projected waveform or histogram of the reference image for dividing the reference image into m×n blocks (m, n are positive integers) to obtain a plurality of reference image blocks; setting a plurality of predetermined paths in at least one of the reference image blocks; and accumulating the pixel values in the paths with respect to the plurality of paths to obtain the projected waveform or histogram of the reference image, and obtaining the projected waveform or histogram of the check image for dividing the check image into m×n blocks (m, n are positive integers) to obtain a plurality of check image blocks; setting a plurality of predetermined paths in at least one of the check image blocks; and accumulating the pixel values in the paths with respect to the plurality of paths to obtain the projected waveform or histogram of the check image.

11. The image collating method of claim 9, further comprising printing the reference image on the medium; and obtaining the check image from the reference image printed on the medium.

12. A computer readable medium storing a program causing a computer to execute a process for collating a reference image as a criterion of processing with a check image obtained by subjecting the reference image to predetermined processing, the process comprising:

obtaining the reference image as a printing object before the printing object is printed on a medium;

setting a plurality of predetermined paths in the reference image, and accumulating pixel values in the paths with respect to the plurality of paths to obtain a projected waveform or histogram of the reference image;

obtaining the check image as the printing object on the medium after the printing object is printed on the medium;

setting the plurality of predetermined paths in the check image, and accumulating the pixel values in the paths with respect to the plurality of paths to obtain the projected waveform or histogram of the check image;

extracting information of a characteristic value as reference characteristic value information from the projected waveform or histogram of the reference image;

extracting information of the characteristic value as check characteristic value information from the projected waveform or histogram of the check image; and collating the reference image with the check image based on the reference characteristic value information and check characteristic value information, wherein the reference characteristic value information is information indicating a position on the projected waveform or histogram where a change of the accumulated value is characteristic in the reference projected waveform or histogram, the check characteristic value information is information indicating a position on the projected waveform or histogram where the change of the accumulated value is characteristic in the check projected waveform or histogram, the collating step collates the reference image with the check image so as to obtain similarity based on the reference characteristic value information and check characteristic value information, comparing the reference characteristic value information with the check characteristic value information to obtain a similarity transformation parameter including a parallel displacement amount, and using the similarity transformation parameter to measure the similarity between the reference image and check image, and to obtain the similarity transformation parameter, setting a predetermined range of scaling margin to at least one amount included in the similarity transformation parameter, and determining the similarity transformation parameter from the range of scaling margin.

13. The computer readable medium according to claim 12, wherein obtaining the projected waveform or histogram of the reference image for dividing the reference image into m×n blocks (m, n are positive integers) to obtain a plurality of reference image blocks; setting a plurality of predetermined paths in at least one of the reference image blocks; and accumulating the pixel values in the paths with respect to the plurality of paths to obtain the projected waveform or histogram of the reference image, and obtaining the projected waveform or histogram of the check image for dividing the check image into m×n blocks (m, n are positive integers) to obtain a plurality of check image blocks; setting a plurality of predetermined paths in at least one of the check image blocks; and accumulating the pixel values in the paths with respect to the plurality of paths to obtain the projected waveform or histogram of the check image.

14. The computer readable medium of claim 12, wherein the process further comprises printing the reference image on the medium; and obtaining the check image from the reference image printed on the medium.

* * * * *